United States Patent
Hirai et al.

(10) Patent No.: US 6,754,437 B1
(45) Date of Patent: Jun. 22, 2004

(54) RECEIVER, RECORDER AND PLAYER

(75) Inventors: Yoshikazu Hirai, Osaka (JP); Kazuhisa Yamada, Osaka (JP); Yasushi Yoneda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/529,803

(22) PCT Filed: Aug. 20, 1999

(86) PCT No.: PCT/JP99/04464

§ 371 (c)(1),
(2), (4) Date: Jun. 22, 2000

(87) PCT Pub. No.: WO00/11864

PCT Pub. Date: Mar. 2, 2000

(30) Foreign Application Priority Data

Aug. 20, 1998 (JP) .......................................... 10/234557

(51) Int. Cl.[7] .............................. H04N 5/91; H04N 7/00; G06F 13/00
(52) U.S. Cl. ............................. 386/83; 386/46; 725/39
(58) Field of Search ............................... 386/46, 83, 1, 386/52, 92, 124, 4, 40; 725/39, 86, 87, 88, 139, 140, 152; H04N 5/91, 7/00; G06F 13/00

(56) References Cited

U.S. PATENT DOCUMENTS 4,879,611 A * 11/1989 Fukui et al.

FOREIGN PATENT DOCUMENTS

| JP | 10021601 | | 1/1998 |
| JP | 11136611 | | 5/1999 |
| WO | WO 99/13471 | * | 3/1999 |

* cited by examiner

Primary Examiner—Robert Chevalier
(74) Attorney, Agent, or Firm—Wenderoth, Lind & Ponack, L.L.P.

(57) ABSTRACT

A receiving apparatus, a recording apparatus, and a reproduction apparatus which can receive and record an interactive program. Time information generated by a CPU is composed by a composition unit in a transport stream that is decoded by a transport decoder, and the time information is recorded in a DVHS recording/reproduction apparatus. The transport stream reproduced by the DVHS recording/reproduction apparatus is decoded by the transport decoder, decoded by an AV decoder, and reproduced.

38 Claims, 21 Drawing Sheets

Fig.20
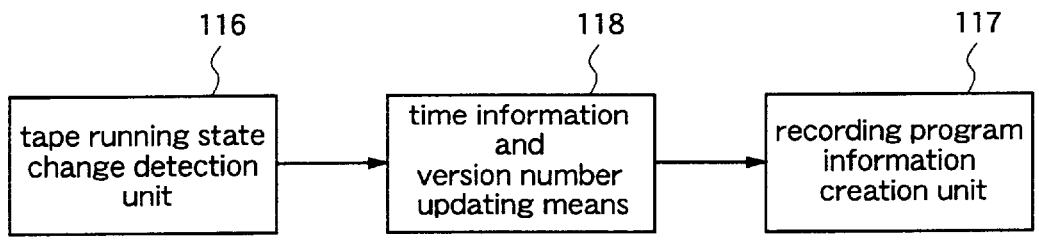
Fig.21 (a)
recording time
Fig.21 (b)
channel A waves
Fig.21 (c)
tape
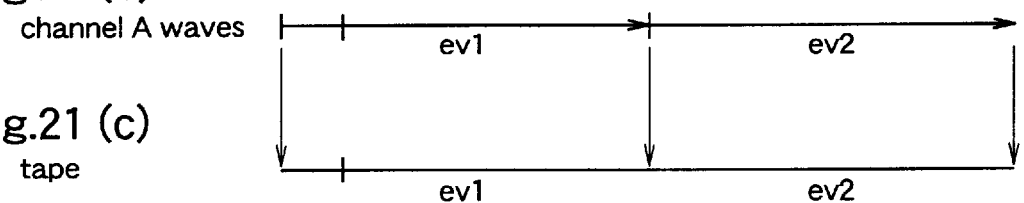
Fig.21 (d)
reproduction
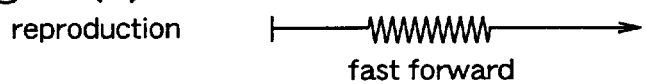
fast forward
Fig.21 (e)
wave
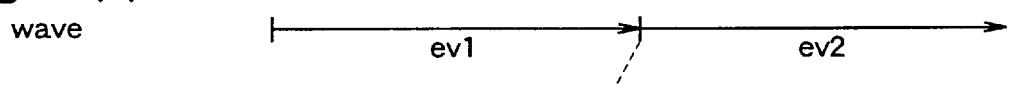
Fig.21 (f)
tape
DIT    DIT
Fig.21 (g)
reproduction
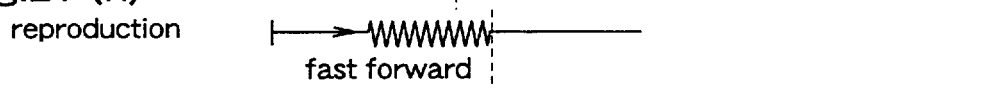
DIT is found
(interruption is known)
Fig.21 (h)
reproduction
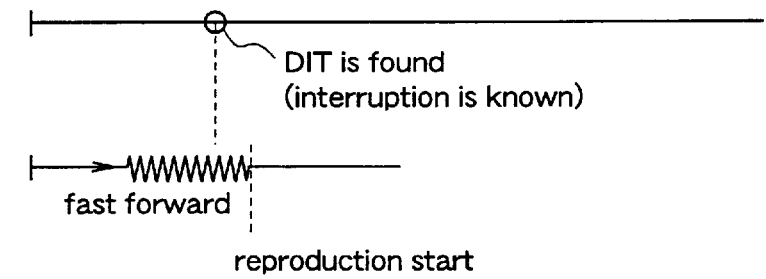
fast forward
reproduction start

RECEIVER, RECORDER AND PLAYER

BACKGROUND OF THE INVENTION

1. Technical Field

The present invention relates to a receiving apparatus, a recording apparatus and a reproduction apparatus, and, more particularly, to a receiving apparatus, a recording apparatus and a reproduction apparatus which is enabled to record an interactive program in a digital magnetic recording/reproduction apparatus in which the interactive program allows an interactive exchange of information between a viewer and a broadcasting station, by, for example, transmitting the program by digital CS broadcasting, adding additional video to original broadcast video, and making the viewer who viewed the video respond.

2. Description of the Related Art

Conventionally, there is no type of the above-described apparatus, but there are only home television receivers for receiving digital CS broadcasting.

FIG. 12 is a block diagram illustrating the structure of the conventional digital CS television receiver.

In FIG. 12, reference numeral 1 denotes an antenna for receiving CS broadcasting. Numeral 2 denotes a receiving unit for receiving the CS broadcasting that is received by the antenna 1 and for demodulating the received CS broadcasting. Numeral 3 denotes a transport decoder for descrambling an MPEG transport stream that is received and demodulated by the receiving unit 2 and for extracting necessary information from the descrambled MPEG transport stream. Numeral 4 denotes an AV decoder for decoding MPEG data concerning video or audio (AV) data that is extracted by the transport decoder 3. Numeral 5 denotes an OSD (On Screen Display) inserting unit for performing superimposition to a video output among outputs of the AV decoder 4. Numeral 6 denotes a display for displaying an output of the OSD (On Screen Display) inserting unit 5. Numeral 7 denotes a speaker for outputting an audio output among the outputs of the AV decoder 4 as a sound.

Next, an operation of the conventional digital CS television receiver will be described. CS broadcast waves that are relayed from a broadcasting station (not shown) by a communication satellite (CS) are received by the antenna 1 for receiving the CS broadcasting, and the received CS broadcast waves are introduced into a digital CS television receiver.

In the digital CS television receiver, the receiving unit 2 selects a CS broadcasting station that is selected by a viewer and demodulates the CS broadcast waves of the selected CS broadcasting station.

Accordingly, an MPEG transport stream is demodulated from the waves of the selected CS broadcasting station and the demodulated MPEG transport stream is transmitted to the transport decoder 3.

The transport decoder 3 descrambles the MPEG transport stream, which was previously scrambled by the broadcasting station, so that original video can be obtained when the MPEG transport stream is later MPEG-decoded. Then, the transport decoder 3 extracts necessary information, i.e., MPEG data concerning video or audio (AV), from the descrambled MPEG transport stream.

The AV decoder 4 executes a MPEG decoding algorithm to the AV MPEG data that is extracted by the transport decoder 3, thereby expanding the data.

The On Screen Display inserting unit 5 generates On Screen information such as a channel that is selected by the viewer or a program table, and superimposes the On Screen information on an original video signal that is demodulated by the AV decoder 4 so as to output the signal.

The display 6 projects the output of the On Screen Display inserting unit 5, which thereby normally displays the original video of the CS broadcasting. When the channel is selected, the display 6 displays video which is obtained by superimposing the information such as the channel that is selected by the viewer on the original video until a predetermined time elapses thereafter.

The speaker 7 outputs an audio signal that is expanded by the AV decoder 4 as a sound.

The conventional digital CS broadcasting receiver is constructed as above, and as a result, multichannel broadcasting of a greater number of channels than the number of channels of the ground waves can be viewed.

With the spread of the digital CS broadcasting receivers, a request to record a broadcast program in a magnetic recording/reproduction apparatus, i.e., a so-called VTR, and to reproduce the program at a required time is naturally produced.

As described above, MPEG transport streams are transmitted as broadcasting information in the digital CS broadcasting. Therefore, a so-called DVHS-standard digital VTRs for recording the MPEG transport stream on a cassette similar to a widespread VHS-standard video cassette as the MPEG transport stream is in the digital format, and reproducing the same are suggested.

In the digital CS broadcasting, digital information other than the original MPEG transport stream can also be transmitted. However, some types of the digital information require time information, such as data that is called "programming" for realizing an interactive program. The conventional digital VTR cannot cope with the recording and reproducing of such digital information, because the conventional digital VTR merely copes with the recording and reproducing of the MPEG transport streams.

In addition, when a medium on which the "programming" is recorded is fast-forwarded and is then returned to the normal reproduction process, sometimes the "programming" should be reloaded, and thus, when the "programming" is one for performing the screen processing, sometimes the screen goes black for a while.

The present invention is made to solve the problems of the above-described prior art. An object of the present invention is to provide a receiving apparatus, a recording apparatus and a reproduction apparatus which also enables digital information requiring time information to be recorded and reproduced.

In addition, the present invention is made to solve the problems of the above-described prior art. Another object of the present invention is to provide a receiving apparatus, a recording apparatus and a reproduction apparatus which do not need to reload the "programming" even when the medium on which the "programming" is recorded is fast-forwarded and returned to the normal reproduction process.

SUMMARY OF THE INVENTION

To solve the above-described problems, a receiving apparatus according to a first aspect of the present invention comprises: an interactive program receiving unit for receiving interactive program broadcasting which includes, in a TDT (Time and Data Table), an absolute time when the broadcasting is executed, and at least one of video and audio and interactive programming, which are indicated, to be a part of the broadcasting; and a broadcast time obtaining unit for obtaining information of the absolute time when the broadcasting is performed, and for managing the absolute time information.

According to the present invention, the interactive program broadcasting can be received together with the time information, which is required in the reproduction of the broadcasting.

A recording apparatus according to a second aspect of the present invention, which records the interactive program received by the receiving apparatus of the first aspect, comprises: a recording program information creation unit for creating an SIT as program information for the recording of the interactive program; a time information management unit for recording the absolute time information that is obtained by the broadcast time obtaining unit, which information is recorded from the TDT, in either of a first descriptor or a second descriptor of the SIT (Selection Information Table); and a storage unit for storing the interactive program that is received by the interactive program receiving unit, in a recording area on a recording medium, and for storing the absolute time information that is obtained from the first descriptor or the second descriptor of the SIT in another area on the recording medium or in a recording apparatus.

According to the present invention, the interactive program broadcasting can be recorded together with the absolute time information, which is required in the reproduction of the broadcasting.

A reproduction apparatus according to the third aspect of the present invention, which reproduces the interactive program recorded in the recording apparatus of the second aspect, comprises: a reproduction time obtaining unit for receiving the absolute time information that is stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the absolute time information that is obtained by the reproduction time obtaining unit. The reproduction apparatus makes the interactive program execution unit reproduce the interactive program from the recording apparatus.

According to the present invention, the interactive program broadcasting can be received together with the time information, which is required in the reproduction of the broadcasting, and the interactive program broadcasting can be reproduced at the same absolute time as that of the recording time.

A reproduction apparatus according to a fourth aspect of the present invention, which reproduces the interactive program that is recorded in the recording apparatus of the second aspect, comprises: a reproduction time obtaining unit for obtaining the absolute time information that is stored in the storage unit; a relative time generation unit for generating relative time information on the basis of the absolute time information that is obtained by the reproduction time obtaining unit; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the relative time information obtained by the relative time generation unit. The reproduction apparatus makes the interactive program execution unit reproduce the interactive program from the recording apparatus.

According to the present invention, the interactive program broadcasting can be received together with the time information which is required in the reproduction of the broadcasting, and the interactive program broadcasting can be reproduced at a time which is different from that of the recording time.

A receiving apparatus according to a fifth aspect of the present invention comprises: an interactive program receiving unit for receiving interactive program broadcasting which includes an absolute time when the broadcasting is executed and at least one of video and audio and interactive programming, which are indicated as a part of the interactive program broadcasting; and a broadcast time obtaining unit for obtaining information of the absolute time when the broadcasting is performed, and for managing the absolute time information.

According to the present invention, the interactive program broadcasting can be received together with the time information which is required in the reproduction of the broadcasting.

A recording apparatus according to a sixth aspect of the present invention, which records the interactive program that is received by the receiving apparatus of the fifth aspect, comprises: a recording program information creation unit for creating program information for the recording of the interactive program; a time information management unit for performing management when the absolute time information that is obtained by the broadcast time obtaining unit is recorded on a recording medium; and a storage unit for storing the interactive program that is received by the interactive program receiving unit in a recording area on the recording medium, and for storing the absolute time information in another area on the recording medium or in a recording apparatus.

According to the present invention, the interactive program broadcasting can be recorded together with the absolute time information which is required in the reproduction of the broadcasting.

A reproduction apparatus according to a seventh aspect of the present invention, which reproduces the interactive program that is recorded in the recording apparatus of the sixth aspect, comprises: a reproduction time obtaining unit for receiving the absolute time information that is stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the absolute time information that is obtained by the reproduction time obtaining unit. The reproduction apparatus makes the interactive program execution unit reproduce the interactive program from the recording apparatus.

According to the present invention, the interactive program broadcasting can be received together with the time information, which is required in the reproduction of the broadcasting, and the interactive program broadcasting can be reproduced at the same absolute time as that of the recording time.

A reproduction apparatus according to an eighth aspect of the present invention, which reproduces the interactive program recorded in the recording apparatus of the sixth aspect, comprises: a reproduction time obtaining unit for obtaining the absolute time information that is stored in the storage unit; a relative time generation unit for generating relative time information on the basis of the absolute time information that is obtained by the reproduction time obtaining unit; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the relative time information that is obtained by the relative time generation unit. The reproduction apparatus makes the interactive program execution unit reproduce the interactive program from the recording apparatus.

According to the present invention, the interactive program broadcasting can be received together with the time information, which is required in the reproduction of the broadcasting, and the interactive program broadcasting can be reproduced at a time which is different from that of the recording time.

A receiving apparatus according to a ninth aspect of the present invention comprises: an interactive program receiving unit for receiving interactive program broadcasting which includes, in a TDT, an absolute time when the broadcasting is executed, and video and audio and interactive programming, which are designated as a part of the interactive program broadcasting; a time information changing unit for changing information of an absolute time of the interactive program that is received by the interactive program receiving unit into information of a relative time from a program start time; a broadcast time obtaining unit for obtaining the information of the absolute time when the broadcasting is performed, and for managing the absolute time information; and a relative time generation unit for generating information of a relative time from the starting (beginning) of the interactive program on the basis of the start time of the interactive program and the absolute time information that is obtained by the broadcast time obtaining unit.

According to the present invention, the interactive program broadcasting can be received together with the time information which is required in the reproduction of the broadcasting.

A recording apparatus according to a tenth aspect of the present invention, which records the interactive program that is received by the receiving apparatus of the ninth aspect, comprises: a recording program information creation unit for creating an SIT as program information for the recording of the interactive program; a time information management unit for recording, in a second descriptor of the SIT the relative time information which is recorded from the absolute time information that is obtained by the broadcast time obtaining unit; and a storage unit for storing the interactive program whose time information is changed by the time information changing unit in an area on a recording medium, and for storing the relative time information that is obtained from the second descriptor of the SIT in another area on the recording medium or in a recording apparatus.

According to the present invention, the interactive program broadcasting can be recorded together with the relative time information which is required in the reproduction of the broadcasting.

According to a recording apparatus of an eleventh aspect of the present invention, in accordance with the recording apparatus of the tenth aspect, the time information management unit records the absolute time information in a first descriptor or the second descriptor of the SIT, in addition to the relative time information.

According to the present invention, the interactive program broadcasting can be recorded together with the relative time information which is required in the reproduction of the broadcasting.

A reproduction apparatus according to the twelfth aspect of the present invention, which reproduces the interactive program that is recorded in the recording apparatus of either the tenth or eleventh aspect, comprises: a reproduction time obtaining unit for receiving the relative time information that is stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction unit and for receiving the interactive program from the storage unit, to thereby execute the interactive program on the basis of the relative time information that is obtained by the reproduction time obtaining unit. The reproduction apparatus makes the interactive program execution unit reproduce the interactive program from the recording apparatus.

According to the present invention, the interactive program broadcasting can be received together with the time information which is required in the reproduction of the broadcasting, and the interactive program broadcasting can be reproduced at an absolute time which is different from that of the recording time.

A receiving apparatus according to a thirteenth aspect of the present invention comprises: an interactive program receiving unit for receiving interactive program broadcasting which includes an absolute time when the broadcasting is executed and video and audio and interactive programming, which are designated as a part of the interactive program broadcasting; a time information changing unit for changing information of the absolute time of the interactive program that is received by the interactive program receiving unit into information of a relative time from a program start time; a broadcast time obtaining unit for obtaining information of the absolute time when the broadcasting is performed, and for managing the absolute time information; and a relative time generation unit for generating information of a relative time from the beginning of the interactive program on the basis of the start time of the interactive program and the absolute time information that is obtained by the broadcast time obtaining unit.

According to the present invention, the interactive program broadcasting can be received together with the time information which is required in the reproduction of the broadcasting.

A recording apparatus according to a fourteenth aspect of the present invention, which records the interactive program that is received by the receiving apparatus of the thirteenth aspect, comprises: a recording program information creation unit for creating program information for the recording of the interactive program; a time information management unit for performing management when the relative time information which is recorded from the absolute time information that is obtained by the broadcast time obtaining unit is recorded on a recording medium; and a storage unit for storing the interactive program whose time information is changed by the time information changing unit in an area on the recording medium, and for storing the relative time information in another area on the recording medium or in a recording apparatus.

According to the present invention, the interactive program broadcasting can be recorded together with the relative time information which is required in the reproduction of the broadcasting.

According to a recording apparatus of the fifteenth aspect of the present invention, in accordance with the recording apparatus of the fourteenth aspect, the time information management unit records the absolute time information in addition to the relative time information.

According to the present invention, the interactive program broadcasting can be recorded together with the absolute time information and the relative time information, which is required in the reproduction of the broadcasting.

A reproduction apparatus according to a sixteenth aspect of the present invention, which reproduces the interactive program recorded in the recording apparatus of either the fourteenth or fifteenth aspect, comprises: a reproduction time obtaining unit for receiving the relative time information stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the relative time information obtained by the reproduction time obtaining unit. The reproduction apparatus makes the interactive program execution unit reproduce the interactive program from the recording apparatus.

According to the present invention, the interactive program broadcasting can be transmitted together with the time information which is required in the reproduction of the broadcasting, and the interactive program broadcasting can be reproduced at an absolute time which is different from that of the recording time.

A receiving apparatus according to a seventeenth aspect of the present invention comprises: an interactive program receiving unit for receiving interactive program broadcasting wherein a time when the broadcasting is executed is indicated by a relative time from a start time of a program, which broadcasting includes video and audio and interactive programming, as a part of the broadcasting and includes an absolute time in a TDT; a start time receiving unit for receiving start time information of the interactive program; and a broadcast time obtaining unit for obtaining information of the absolute time when the broadcasting is performed, and for managing the absolute time information.

According to the present invention, the interactive program broadcasting can be received together with the time information which is required in the reproduction of the broadcasting.

A recording apparatus according to an eighteenth aspect of the present invention, which records the interactive program that is received by the receiving apparatus of the seventeenth aspect, comprises: a recording program information creation unit for creating an SIT as program information for the recording of the interactive program; a time information unit for recording the absolute time information that is obtained by the broadcast time obtaining unit and relative time information from the start time of the program that is obtained by the interactive program receiving unit in a second descriptor of the SIT; and a storage unit for storing the interactive program that is received by the interactive program receiving unit in a recording area on a recording medium, and for storing the absolute time information and the relative time information, which is obtained from the second descriptor of the SIT, in another area on the recording medium or in a recording apparatus.

According to the present invention, the interactive program broadcasting can be recorded together with the time information which is required in the reproduction of the broadcasting.

According to a recording apparatus of a nineteenth aspect of the present invention, in accordance with the recording apparatus of the eighteenth aspect, the time information management unit records the absolute time information in a first descriptor of the SIT.

According to the present invention, the interactive program broadcasting can be recorded together with the time information which is required in the reproduction of the broadcasting.

A reproduction apparatus according to a twentieth aspect of the present invention, which reproduces the interactive program that is recorded in the recording apparatus of either the eighteenth or nineteenth aspect, comprises: a reproduction time obtaining unit for receiving the absolute time information stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction and for receiving the interactive program from the storage unit so as to generate relative time information on the basis of the absolute time information that is obtained by the reproduction time obtaining unit and the program start time information that is obtained from the storage unit, to thereby execute the interactive program. The reproduction apparatus makes the interactive program execution unit reproduce the interactive program from the recording apparatus.

According to the present invention, the interactive program broadcasting can be transmitted together with the time information which is required in the reproduction of the broadcasting, and the interactive program broadcasting can be reproduced at an absolute time which is different from that of the recording time.

A receiving apparatus according to a twenty-first aspect of the present invention comprises: an interactive program receiving unit for receiving interactive program broadcasting wherein a time when the broadcasting is executed is indicated by a relative time from a start time of a program, which broadcasting includes video and audio and interactive programming, as a part of the broadcasting, and which includes an absolute time; a start time receiving unit for receiving start time information of the interactive program; and a broadcast time obtaining unit for obtaining information of the absolute time when the broadcasting is performed, and for managing the absolute time information.

According to the present invention, the interactive program broadcasting can be received together with the time information which is required in the reproduction of the broadcasting.

A recording apparatus according to the twenty-second aspect of the present invention, which records the interactive program that is received by the receiving apparatus of the twenty-first aspect, comprises: a recording program information creation unit for creating program information for the recording of the interactive program; a time information management unit for recording the absolute time information that is obtained by the broadcast time obtaining unit and information of a relative time from the start time of the program that is obtained by the interactive program receiving unit; and a storage unit for storing the interactive program that is received by the interactive program receiving unit in a recording area on a recording medium, and for storing the absolute time information and the relative time information in another area on the recording medium or in a recording apparatus.

According to the present invention, the interactive program broadcasting can be recorded together with the time information which is required in the reproduction of the broadcasting.

A reproduction apparatus according to a twenty-third aspetc of the present invention, which reproduces the interactive program that is recorded in the recording apparatus of the twenty-second aspect, comprises: a reproduction time obtaining unit for receiving the absolute time information stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction receiving unit and for receiving the interactive program from the storage unit, so as to generate relative time information on the basis of the absolute time information that is obtained by the reproduction time obtaining unit and the program start time information that is obtained from the storage unit, to thereby execute the interactive program. The reproduction apparatus makes the interactive program execution unit reproduce the interactive program from the recording apparatus.

According to the present invention, the interactive program broadcasting can be transmitted together with the time information which is required in the reproduction of the broadcasting, and the interactive program broadcasting can be reproduced at an absolute time which is different from that of the recording time.

A receiving apparatus according to the twenty-fourth aspect of the present invention comprises: an interactive program receiving unit for receiving interactive program broadcasting wherein a time when the broadcasting is executed is indicated by a relative time from a start time of a program, which broadcasting includes video and audio and interactive programming, as a part of the broadcasting and which includes an absolute time in a TDT; a start time receiving unit for receiving start time information of the interactive program; a broadcast time obtaining unit for obtaining information of the absolute time when the broadcasting is performed, and for managing the absolute time information; and a relative time generation unit for generating information of a relative time from the beginning of the interactive program, on the basis of the start time information of the interactive program, which is obtained by the start time receiving unit and the absolute time information that is obtained by the broadcast time obtaining unit.

According to the present invention, the interactive program broadcasting can be received together with the time information which is required in the reproduction of the broadcasting.

A recording apparatus according to the twenty-fifth aspect of the present invention, which records the interactive program that is received by the receiving apparatus of the twenty-fourth aspect, comprises: a recording program information creation unit for creating a SIT as program information for the recording of the interactive program; a time information management unit for recording relative time information which is recorded from the absolute time information that is obtained by the broadcast time obtaining unit in a second descriptor of the SIT; and a storage unit for storing the interactive program in a recording area on a recording medium, and for storing the relative time obtained from the second descriptor of the SIT in another area on the recording medium or in a recording apparatus.

According to the present invention, the interactive program broadcasting can be recorded together with the time information which is required in the reproduction of the broadcasting.

According to a recording apparatus of the twenty-sixth aspect of the present invention, in accordance with the recording apparatus of the twenty-fifth aspect, the time information management unit records the absolute time information in a first descriptor of the SIT.

According to the present invention, the interactive program broadcasting can be recorded together with the time information which is required in the reproduction of the A reproduction apparatus according to the twenty-seventh aspect of the present invention, which reproduces the interactive program recorded in the recording apparatus of either the twenty-fifth or twenty-sixth aspect, comprises: a reproduction time obtaining unit for receiving the relative time information that is stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the relative time information that is obtained by the reproduction time obtaining unit. The reproduction apparatus reproduces the interactive program from the recording apparatus.

According to the present invention, the interactive program broadcasting can be transmitted together with the time information which is required in the reproduction of the broadcasting, and the interactive program broadcasting can be reproduced at an absolute time which is different from that of the recording time.

A receiving apparatus according to the twenty-eighth aspect of the present invention comprises: an interactive program receiving unit for receiving interactive program broadcasting wherein a time when the broadcasting is executed is indicated by a relative time from a start time of a program, which broadcasting includes video and audio and interactive programming, as a part of the broadcasting; a start time receiving unit for receiving start time information of the interactive program; a broadcast time obtaining unit for obtaining information of the absolute time when the broadcasting is performed, and for managing the absolute time information; and a relative time generation unit for generating information of a relative time from starting of the interactive program, on the basis of the start time information of the interactive program, which is obtained by the start time receiving unit and the absolute time information that is obtained by the broadcast time obtaining unit.

According to the present invention, the interactive program broadcasting can be received together with the time information which is required in the reproduction of the broadcasting.

A recording apparatus according to the twenty-ninth aspect of the present invention, which records the interactive program that is received by the receiving apparatus of the twenty-eighth aspect, comprises: a recording program information creation unit for creating program information for the recording of the interactive program; a time information management unit for recording relative time information which is recorded from the absolute time information that is obtained by the broadcast time obtaining unit; and a storage unit for storing the interactive program in a recording area on a recording medium, and for storing the relative time in another area on the recording medium or in a recording apparatus.

According to the present invention, the interactive program broadcasting can be recorded together with the time information which is required in the reproduction of the broadcasting.

A reproduction apparatus according to the thirtieth aspect of the present invention, which reproduces the interactive program recorded in the recording apparatus of the twenty-ninth aspect, comprises: a reproduction time obtaining unit for receiving the relative time information that is stored in the storage unit, and for reproducing a flow of time at the recording time; a reproduction instruction unit for detecting whether the interactive program is recorded in the storage unit, and for issuing a reproduction instruction automatically or in accordance with an instruction by a user; and an interactive program execution unit for receiving the reproduction instruction from the reproduction instruction unit and for receiving the interactive program from the storage unit to thereby execute the interactive program on the basis of the relative time information obtained by the reproduction time obtaining unit. The reproduction apparatus reproduces the interactive program from the recording apparatus.

According to the present invention, the interactive program broadcasting can be transmitted together with the time information which is required in the reproduction of the broadcasting, and the interactive program broadcasting can be reproduced at an absolute time which is different from that of the recording time.

According to a receiving apparatus of a thirty-first aspect of the present invention, in accordance with the receiving apparatus of any of the first, fifth, ninth, thirteenth, seventeenth, twenty-first, twenty-fourth and twenty-eighth aspects, the time information transmitted together with a transport stream including the interactive program is information of a relative time from the starting of each program.

According to the present invention, the interactive program broadcasting can be received together with the time information which is required in the reproduction of the broadcasting.

According to a recording apparatus of a thirty-second aspect of the present invention, the recording apparatus of any of the second, sixth, tenth, fourteenth, eighteenth, twenty-second, twenty-fifth and twenty-ninth aspects comprises: recording medium running state change detection means for detecting a change in a running state of the recording medium in the storage unit; and running state information updating means for updating running state change information which reflects the change in the running state of the recording medium when the recording medium running state change detection means detect the change in the running state of the recording medium.

According to the present invention, the interactive program broadcasting can be recorded together with the time information which is required in the reproduction of the broadcasting.

According to a recording apparatus of a thirty-third aspect of the present invention, in accordance with the recording apparatus of the thirty-second aspect, the running state information updating means writes the running state change information in the SIT.

According to the present invention, the interactive program broadcasting can be recorded together with the time information which is required in the reproduction of the broadcasting.

According to a recording apparatus of a thirty-fourth aspect of the present invention, in accordance with the recording apparatus of the thirty-second aspect, the running state information updating means updates the running state change information in program units.

According to the present invention, the interactive program broadcasting can be recorded together with the time information which is required in the reproduction of the broadcasting.

According to a recording apparatus of a thirty-fifth aspect of the present invention, in accordance with the recording apparatus of the thirty-second aspect, the running state information updating means updates the running state change information in recording apparatus units.

According to the present invention, the interactive program broadcasting can be recorded together with the time information which is required in the reproduction of the broadcasting.

BRIEF DESCRIPTION OF THE DRAWINGS

FIG. 20 is a block diagram illustrating a time information and version number changing means of a receiving apparatus, a recording apparatus, and a reproduction apparatus according to a second embodiment of the present invention.

FIGS. 21(a) to 21(h) are time charts showing a fast forward operation and a normal reproduction in the receiving apparatus, the recording apparatus, and the reproduction apparatus of the second embodiment.

FIG. 21(a) is a diagram showing a state where information is successively recorded in the recording of programs.

FIG. 21(b) is a diagram showing a state where a program 1 of a channel A is interrupted and changed into a program 2.

FIG. 21(c) is a diagram showing a state where the waves shown in

FIG. 21(b) are recorded on a tape.

FIG. 21(d) is a diagram showing a state where part of the tape is fast-forwarded during a reproduction of the tape.

FIG. 21(e) is a diagram showing a state where a program is replaced with another program.

FIG. 21(f) is a diagram showing a state where recording of a program is interrupted in the middle of the recording of the program and then recording is resumed from the beginning of a next program.

FIG. 21(g) is a diagram showing a case where a tape on which the recording is performed in the state shown in FIG. 21(f) is successively normal-reproduced.

FIG. 21(h) is a diagram showing a state where the fast forward operation is performed in a section including a DIT which is added to a part corresponding to the beginning of the next program.

DETAILED DESCRIPTION OF THE INVENTION

First Embodiment

Figure 1:
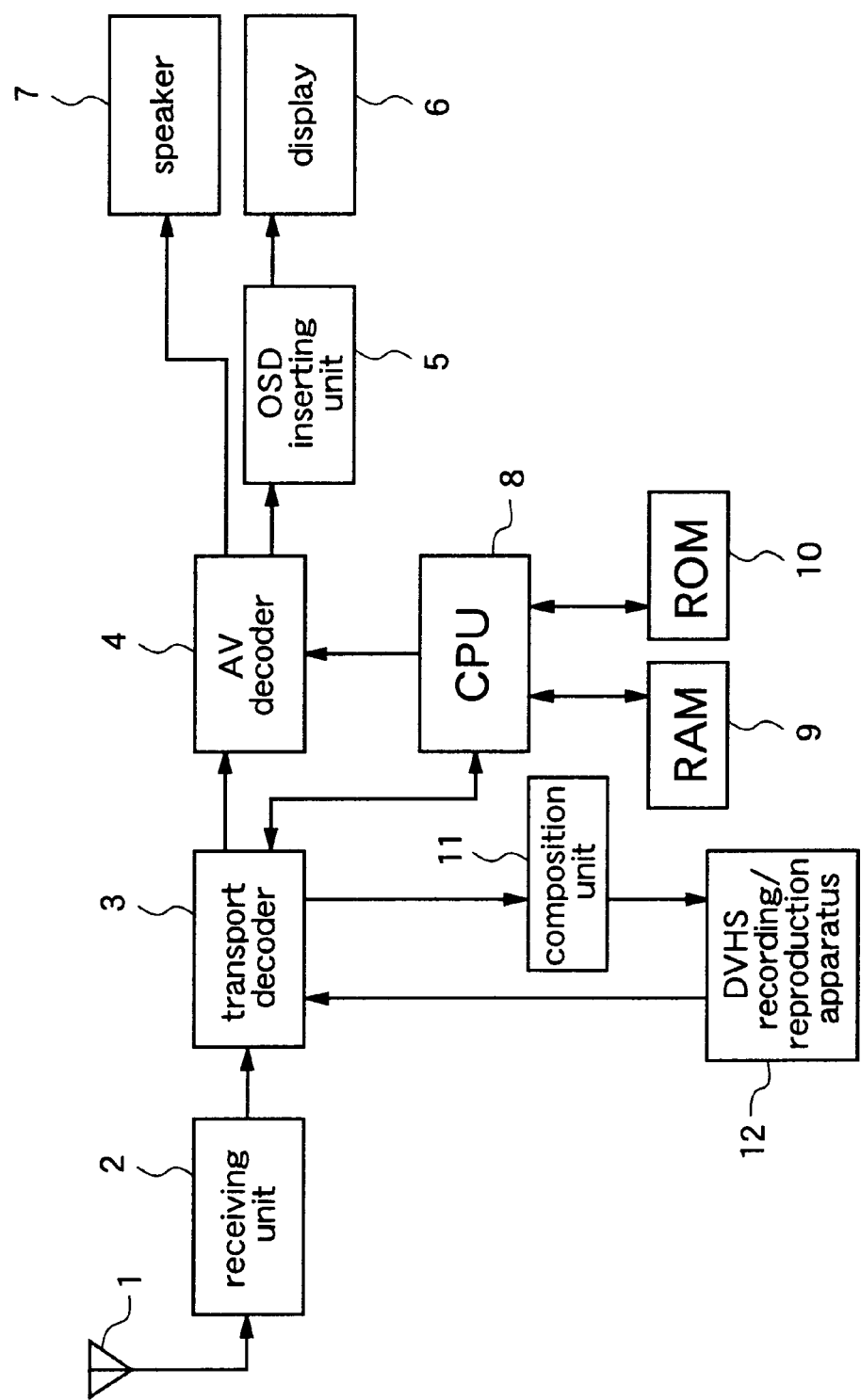
FIG. 1 is a block diagram illustrating structures of a receiving apparatus, a recording apparatus, and a reproduction apparatus according to a first embodiment of the present invention.

FIG. 1 illustrates a transmitting apparatus, a receiving apparatus, and a recording apparatus according to a first embodiment of the present invention. Numeral 1 denotes an antenna for receiving communication satellite (CS) broadcasting. Numeral 2 denotes a receiving unit for receiving the CS broadcasting that is received by the antenna 1 and for demodulating the received CS broadcasting. Numeral 3 denotes a transport decoder for descrambling an MPEG transport stream that is received and demodulated by the receiving unit 2 and for extracting necessary information from the descrambled MPEG transport stream. Numeral 4 denotes an AV decoder for decoding MPEG data concerning video or audio (AV) data that is extracted by the transport decoder 3. Numeral 5 denotes an OSD (On Screen Display) inserting unit for performing superimposition to a video output among outputs of the AV decoder 4. Numeral 6 denotes a display for displaying an output of the OSD (On Screen Display) inserting unit 5. Numeral 7 denotes a speaker for outputting an audio output among the outputs of the AV decoder 4 as a sound.

In addition, numeral 8 denotes a CPU which is added in the first embodiment. The CPU processes data which is stored in a RAM 9 on the basis of programming stored in a ROM 10 to thereby execute programming which realizes an "interpreter" for interpreting and executing "programming" constituting an interactive program, or to control the whole of the receiving apparatus, the recording apparatus, and the reproduction apparatus.

Numeral 11 denotes a composition unit for rewiring time information which is included in the MPEG transport stream that is extracted by the transport decoder 3 as is required. The composition unit 11 restructures program information as a SIT when the program information is stored in a digital video home system (DVHS) recording/reproduction apparatus 12.

Numeral 12 denotes a DVHS recording/reproduction apparatus for recording the MPEG transport stream that is output from the composition unit 11 as the MPEG transport stream is in the digital format, and for reproducing the transport stream.

Next, an operation of the receiving apparatus, the recording apparatus and the reproduction apparatus of the first embodiment will be described. CS broadcast waves relayed from a broadcasting station (not shown) by a communication satellite (CS) are received by the antenna 1 for receiving the CS broadcasting, and the CS broadcast waves are introduced into a digital CS television receiver.

In the digital CS television receiver, the receiving unit 2 selects a CS broadcasting station that is selected by a viewer, receives the waves only from the selected CS broadcasting station, and demodulates the waves.

Accordingly, an MPEG transport stream is demodulated from the waves of the selected CS broadcasting station and the demodulated MPEG transport stream is transmitted to the transport decoder 3.

The transport decoder 3 descrambles the demodulated MPEG transport stream, which is scrambled previously by the broadcasting station, so that original video can be obtained when MPEG decoding is performed later. Then, the transport decoder extracts necessary information, i.e., MPEG data concerning video or audio (AV), from the descrambled MPEG transport stream.

The AV decoder 4 executes an MPEG decoding algorithm to the AV MPEG data that is extracted by the transport decoder 3, which thereby expands the data.

The On Screen Display inserting unit 5 generates On Screen information, such as a channel selected by the viewer or a program table, and superimposes the On Screen information on an original video signal demodulated by the AV decoder 4 so as to output the signal.

The display 6 projects the output of the On Screen Display inserting unit 5 to thereby normally display the original video of the CS broadcasting, and, when the channel is selected, the display 6 displays video that is obtained by superimposing the information such as the channel selected by the viewer on the original video until a predetermined time elapses thereafter.

The speaker 7 outputs an audio signal that is expanded by the AV decoder 4 as a sound.

The composition unit 11 changes time information that is added by the broadcasting station to the MPEG transport stream that is descrambled by the transport decoder 3 as is required.

That is, ① when the time information which is included in the MPEG transport stream (or data stream) that is transmitted from the broadcasting station is absolute time information, the composition unit 11 outputs the absolute time information without changing the absolute time information. In this case, this absolute time information is transmitted by a TDT, in the case of the MPEG transport stream.

② Even when the time information which is included in the MPEG transport stream (or data stream) is the absolute time information, the composition unit 11 sometimes changes the absolute time information to relative time information from a program start time, and the composition unit 11 outputs an elapsed time of the program.

③ When the time information which is included in the MPEG transport stream (or data stream) is the relative time information, the composition unit 11 changes the relative time information to the absolute time information, and the composition unit 11 writes the program start time.

④ Even when the time information which is included in the MPEG transport stream (or data stream) is the relative time information, the composition unit 11 outputs the relative time information without changing the relative time information.

The DVHS recording/reproduction apparatus 12 records the MPEG transport stream (or data stream) including the time information, which is changed by the composition unit 11 as required, on a widespread VHS-standard video cassette tape as the MPEG transport stream is in the digital format.

At the reproduction time, the DVHS recording/reproduction apparatus transmits a transport stream (or data stream), which is almost the same as the transport stream transmitted from the broadcasting station, to the transport decoder 3 so as to reproduce the video and audio of the recorded program.

Accordingly, at the reproduction time in the case where the recording ① is performed, contents of the recorded program are reproduced according to the absolute time on the basis of the absolute time recorded on the tape.

At the reproduction time in the case where the recording ② is performed, the contents of the recorded program are reproduced according to the relative time that is recorded on the tape.

At the reproduction time in the case where the recording ③ is performed, a relative time is obtained from a program start time, which is previously recorded on the tape, and an absolute time, and the contents of the program are reproduced according to the relative time.

At the reproduction time in the case where the recording ④ is performed, the contents of the recorded program are reproduced according to the relative time which is previously recorded on the tape.

Figure 13:
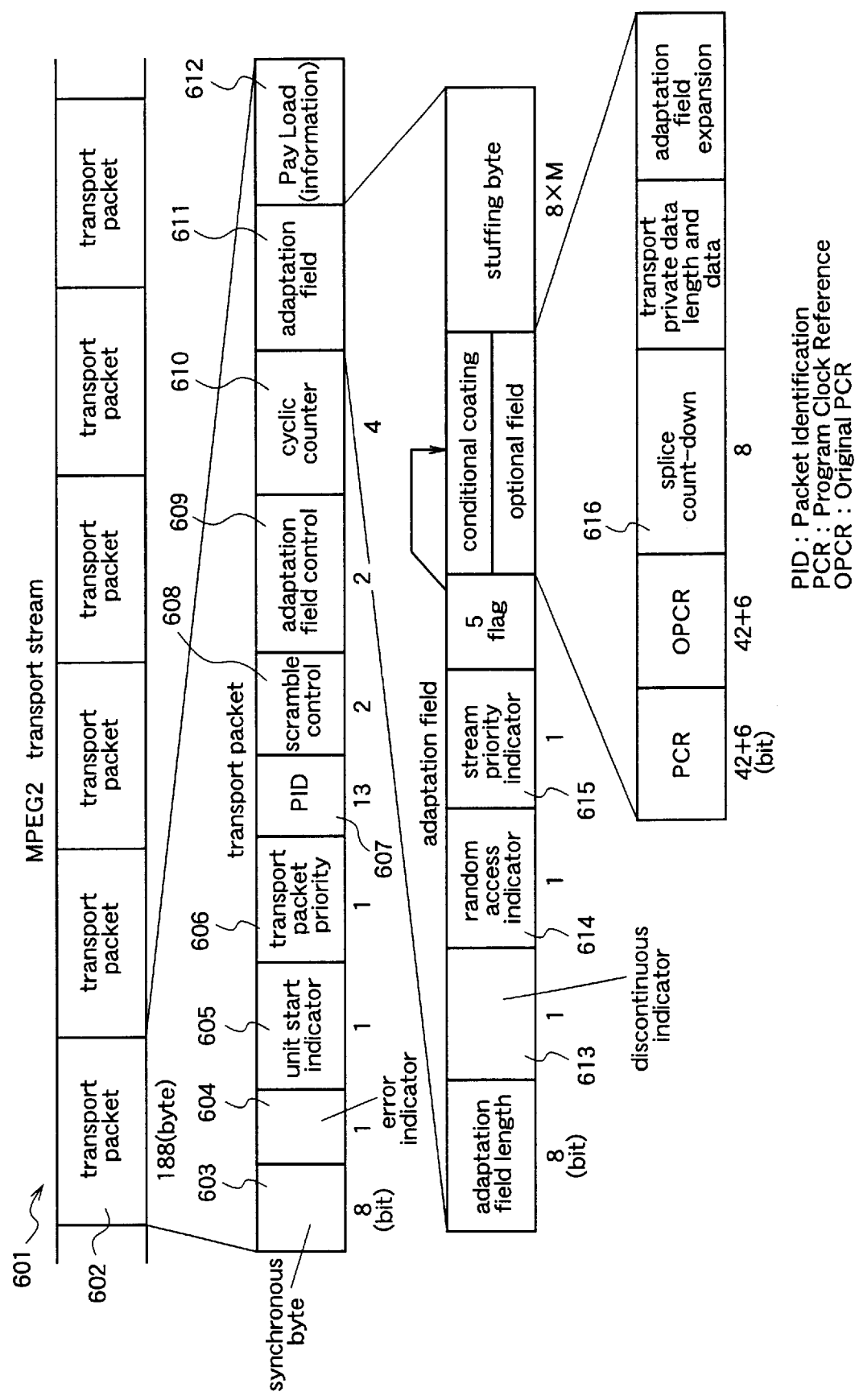
FIG. 13 is an explanatory diagram illustrating a structure of a transport stream.

Generally, as shown in FIG. 13, various types of information such as video and audio are transmitted by a transport stream in the digital broadcasting. FIG. 13 is reprinted from FIGS. 11–16 on page 248 in "Latest Manual of MPEG" published on Aug. 1, 1994, by ASCII Corporation. In FIG. 13, numeral 601 denotes a transport stream. The transport stream is constructed by arranging a plurality of transport stream packets (hereinafter referred to as TS packet or TSP) 602 of fixed length. In order to simplify the description of each of the plurality of transport stream packets in the transport stream, it should be understood that each of the plurality of transport stream packets are similarly constructed, unless otherwise noted. A packet ID (PID) 607 indicating the type of data that is contained in each packet is added to the TS packet 602. The TS packet 602 further includes: a synchronous byte information 603 for allowing a decoder to detect a head of the TS packet; an error indicator information 604 for indicating the presence or absence of a bit error in the packet; a unit start indicator information 605 for indicating that a new PES packet or section starts from the TS packet; a packet priority information 606 for indicating significance of Pay Load in the packet; a scramble control information 608 for indicating the presence or absence of scrambling and a class of scrambling in the packet; an adaptation field control information 609 for indicating the presence or absence of an adaptation field and the presence or absence of the Pay Load in the packet, a cyclic counter information 610, which is information for detecting whether a packet having the same PID is partly rejected midway; an adaptation field information 611 to which additional information concerning an individual stream or stuffing byte (inefficient data byte) can be optionally registered; and a Pay Load information 612 as effective packet data.

In addition, the adaptation field information 611 includes: a discontinuous indicator information 613 for indicating that a system clock is reset and that contents are changed in a next packet having the same PID; a random access indicator information 614 for indicating a sequence header of video or a frame start of audio and for indicating an entry point of a random access; a stream priority indicator information 615 for indicating that an important part of the individual stream is in the Pay Load of the packet; and a splice count-down information 616 for indicating the number of transport packets having the same PID before an editable point.

Hereinafter, to simplify the description, assume that the transport stream transmits two programs, i.e., a program 1 and a program 2. In this case, different packet IDs are given to a TS packet for video of the program 1 (hereinafter referred to as TSP video 1), a TS packet for audio of the program 1 (hereinafter referred to as TSP audio 1), a TS packet for video of the program 2 (hereinafter referred to as TSP video 2), and a TS packet for audio of the program 2 (hereinafter referred to as TSP audio 2), respectively. Further, a TS packet for transmitting information indicating which packet ID is assigned to which information, i.e., a PMT (Program Map Table), is set in each program.

Assume that a PMT corresponding to the program 1 is referred to as TSP-PMT 1 and a PMT corresponding to the program 2 is referred to as TSP-PMT 2. The PMT contains a packet ID of a TS packet for video or audio of its corresponding program. In addition, there is a TS packet for transmitting a PAT (Program Association Table) which represents a correspondence between a packet ID of a TS packet containing the PMT and a program number (which TS packet is hereinafter referred to as TSP-PAT), and a TS packet for transmitting a NIT, which represents a state of a data transmission system of the broadcasting (hereinafter referred to as TSP-NIT) and the like, as information concerning the whole broadcasting. A packet ID is assigned to each TS packet.

Figure 8:
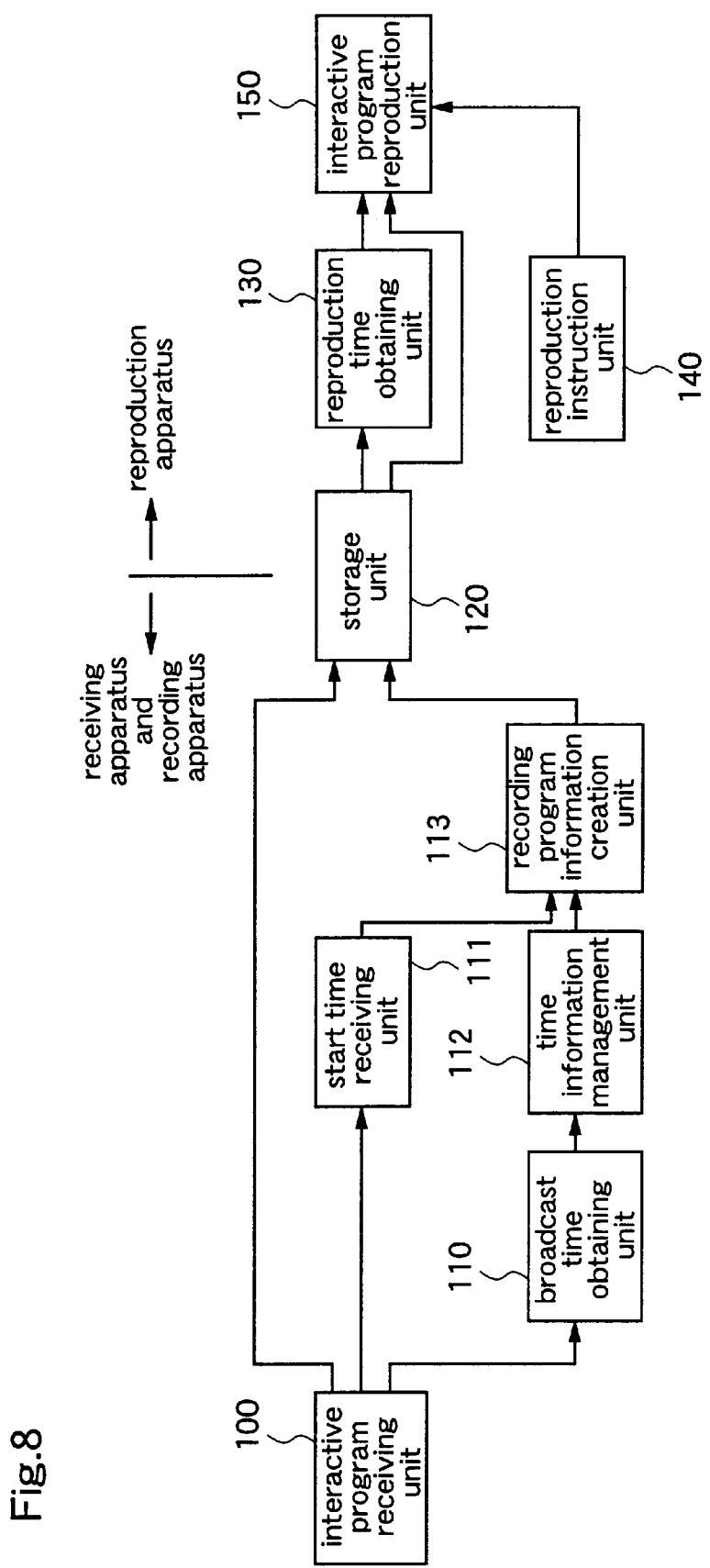
FIG. 8 is a block diagram representing a variation of the receiving apparatus, the recording apparatus, and the reproduction apparatus of FIG. 1.
Figure 9:
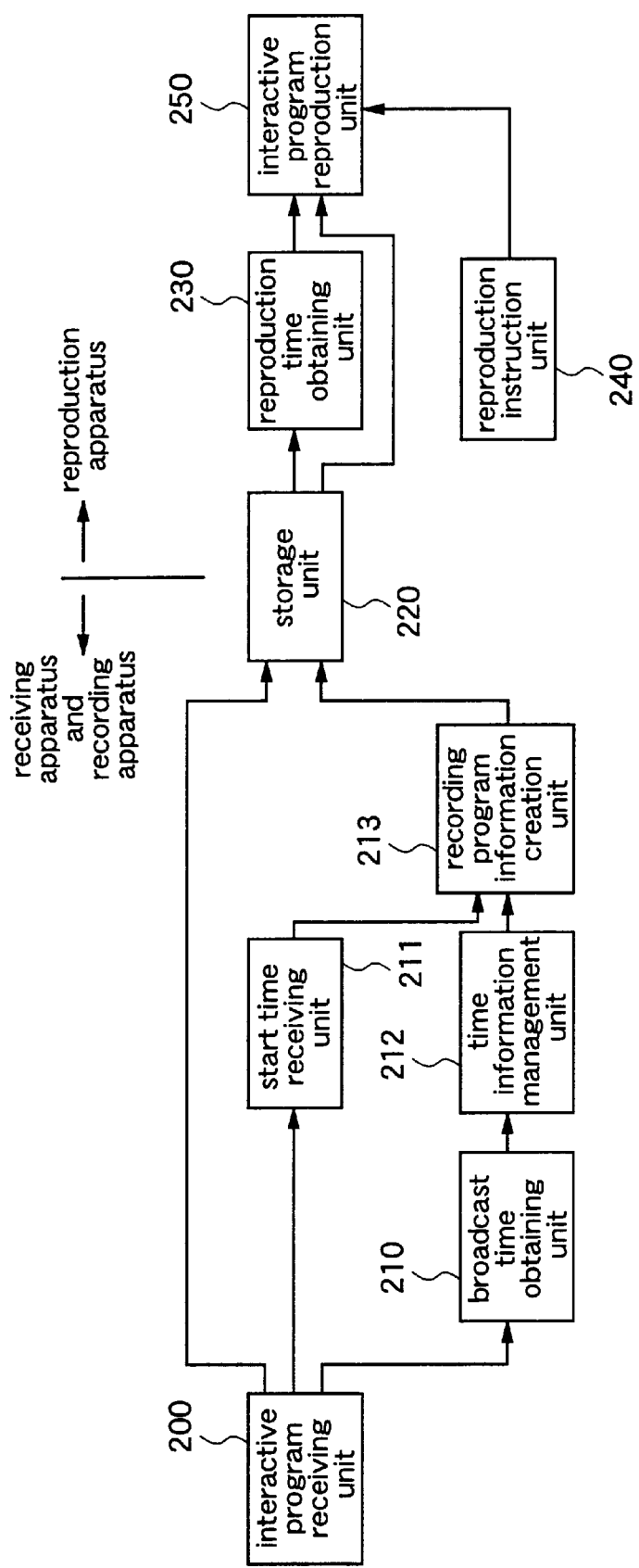
FIG. 9 is a block diagram representing a variation of the receiving apparatus, the recording apparatus, and the reproduction apparatus of FIG. 1.
Figure 14:
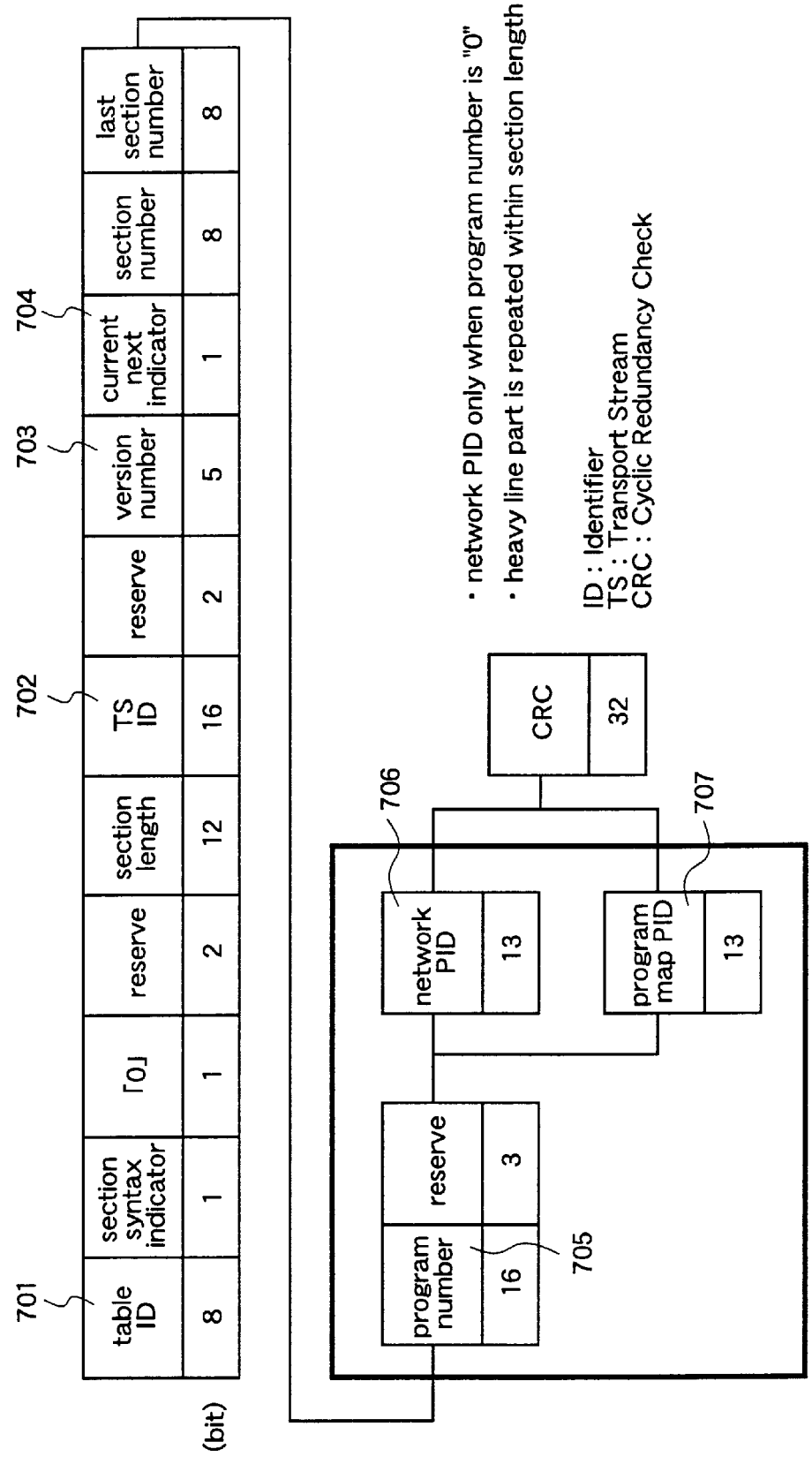
FIG. 14 is an explanatory diagram illustrating a packet ID of a PAT.

FIG. 14 is reprinted from FIGS. 8–9 on page 144 in "Practical Manual of MPEG" published on Nov. 1, 1995, by ASCII Corporation. FIG. 14 illustrates a PAT that represents the correspondence between each program number (16 bits) and a packet ID of a PMT of that program. The PAT includes a table ID 701 for indicating a class of a table, a transport stream ID 702 for identifying a stream (multiplexed coded data), a version number information 703 to which the addition is performed at every renewal of the content in the table, a current next indicator information 704 which is used to identify new and old versions when such versions transmitted simultaneously, a program number information 705 for identifying each program, a network PID 706 for indicating a PID of a network information table, a program map PID 707 for indicating a PID of a program map table, and the like.

Figure 10:
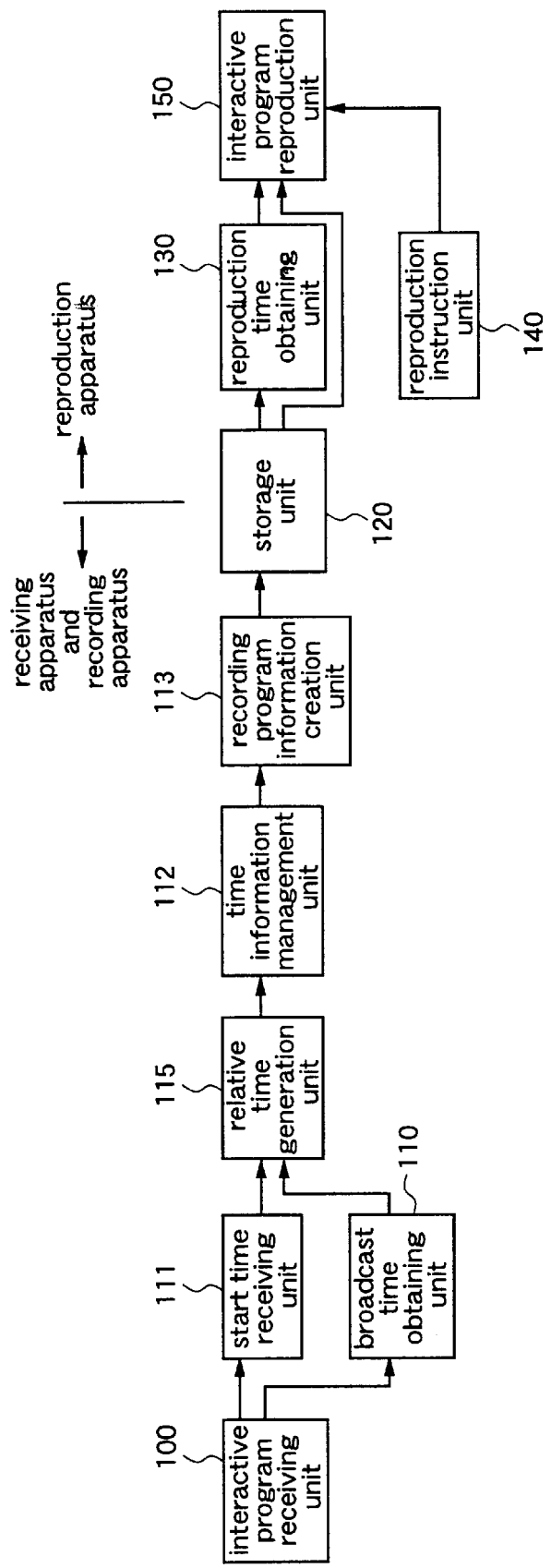
FIG. 10 is a block diagram representing a variation of the receiving apparatus, the recording apparatus, and the reproduction apparatus of FIG. 1.
Figure 15:
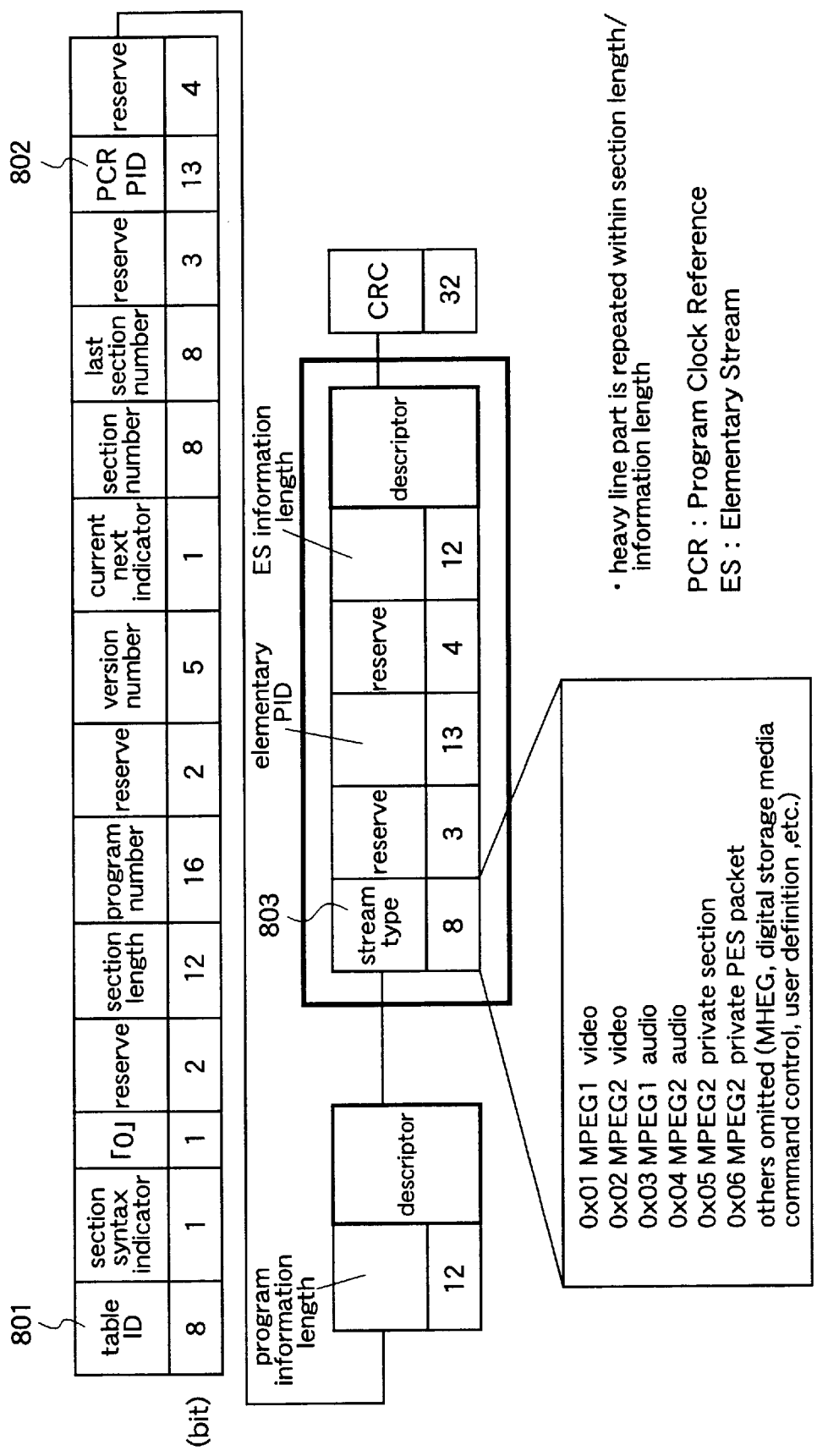
FIG. 15 is an explanatory diagram illustrating a PMT as a PID of a packet.

Further, FIG. 15 is reprinted from FIGS. 8–10 on page 145 in the above-described "Practical Manual of MPEG". FIG. 15 illustrates a PMT that represents a PID of a packet for transmitting a stream such as video, audio and additional data which constitute a program for each program number. The PMT includes a table ID 801 for indicating a class of a table, a PCR PID 802 for indicating a PID of a packet which contains a clock (PCR) as a reference at the decoding time, a stream type information 803 for indicating a type of information included in a data stream, and the like.

Figure 16:
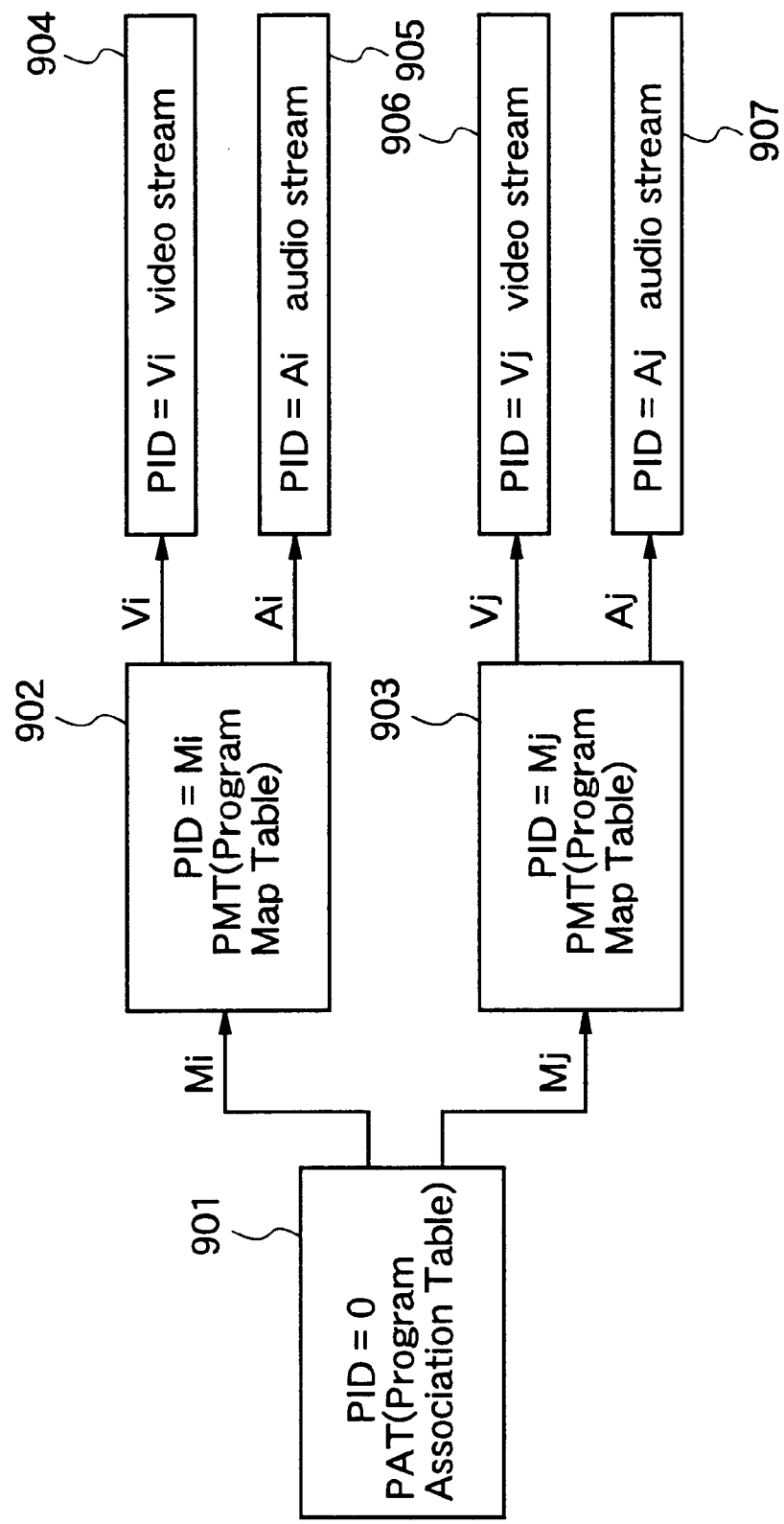
FIG. 16 is an explanatory diagram illustrating an example of a hierarchical structure of a transport stream.

Further, FIG. 16 is reprinted from FIGS. 11–17 on page 250 in the above-described "Latest Manual of MPEG". FIG. 16 illustrates an example of a hierarchical structure of a transport stream. PMTs 902 and 903 exist in one layer below the PAT 901, a video stream 904 and an audio stream 905 exist in one layer below the PMT 902, and a video stream 906 and an audio stream 907 exist in one layer below the program map table 903, respectively.

Figure 17:
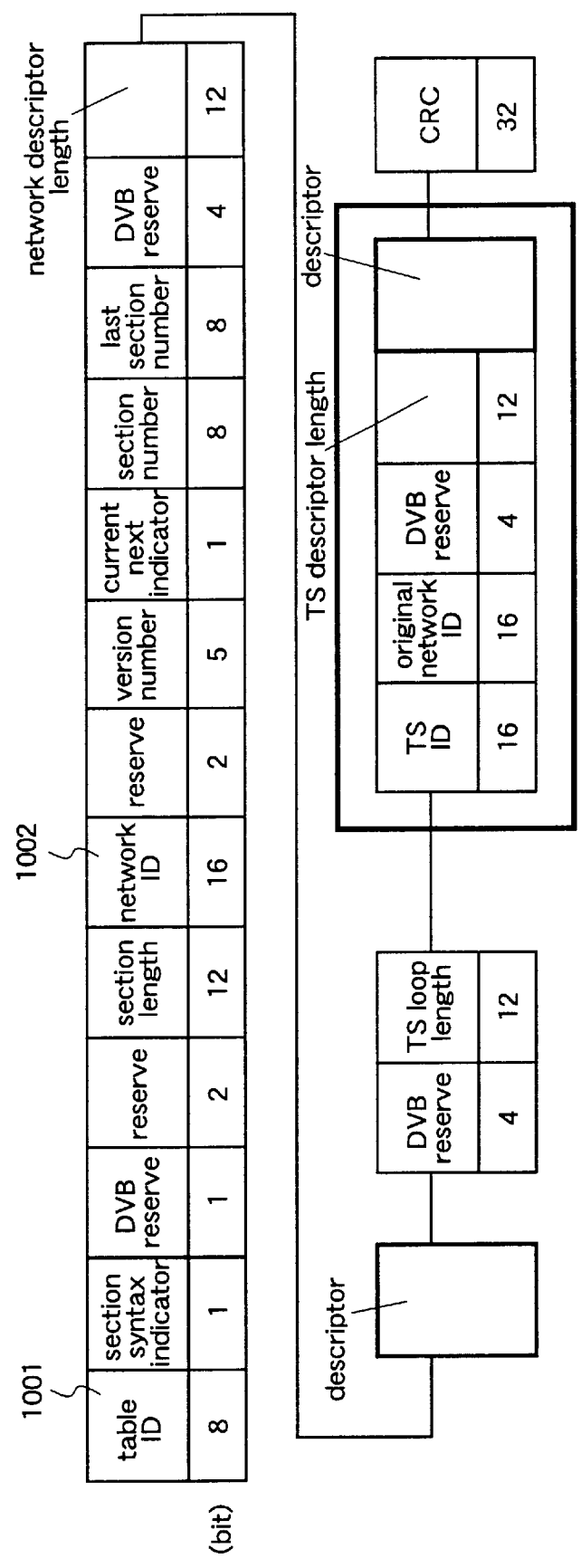
FIG. 17 is an explanatory diagram illustrating a packet ID of a NIT.

FIG. 17 is reprinted from FIGS. 8–11 on page 146 in the above-described "Practical Manual of MPEG". FIG. 17 illustrates a NIT that represents physical information concerning a transmission path. The NIT includes a table ID 1001 for indicating a class of a table, a network ID 1002 for identifying a network, and the like.

As examples of the transport streams to be input and output between the transport decoder and the DVHS recording/reproduction apparatus, there are any number of transport streams before being demultiplexed or partial transport streams. The partial transport stream is a bitstream that is obtained by removing transport packets having no relation to particularly selected one or more programs from transport packets of MPEG2.

A DIT indicates a change point at which program arrangement information of a program transmitted by a partial transport stream may be discontinuous. A Section Information Table (SIT) shows information for indicating information pertaining to a program that is transmitted by a partial transport stream.

Figure 18:
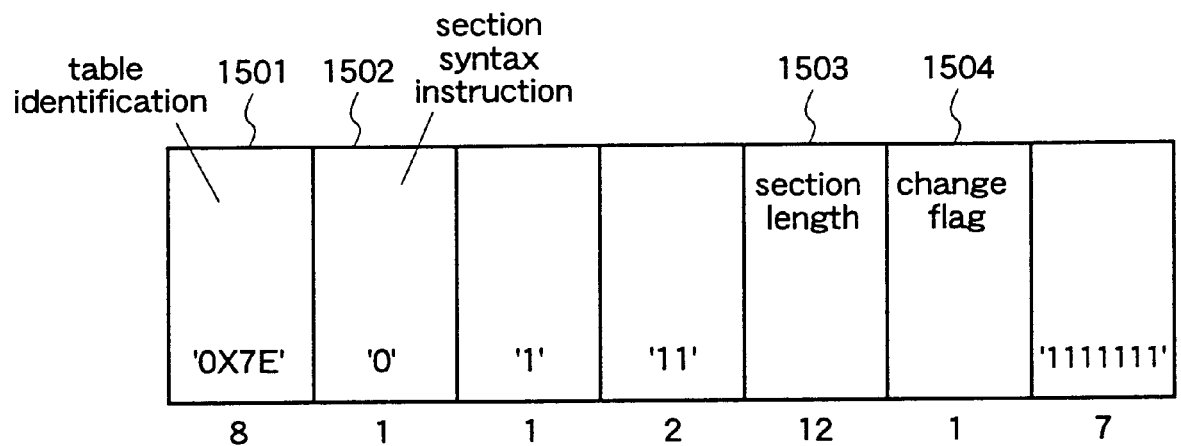
FIG. 18 is an explanatory diagram illustrating a data structure of a DIT.

FIG. 18 illustrates a data structure of the above-described DIT. The DIT includes information 1501 for identifying a table, information 1502 for indicating a section syntax, information 1503 for showing a section length, and information 1504 for showing a change flag and the like.

Figure 19:
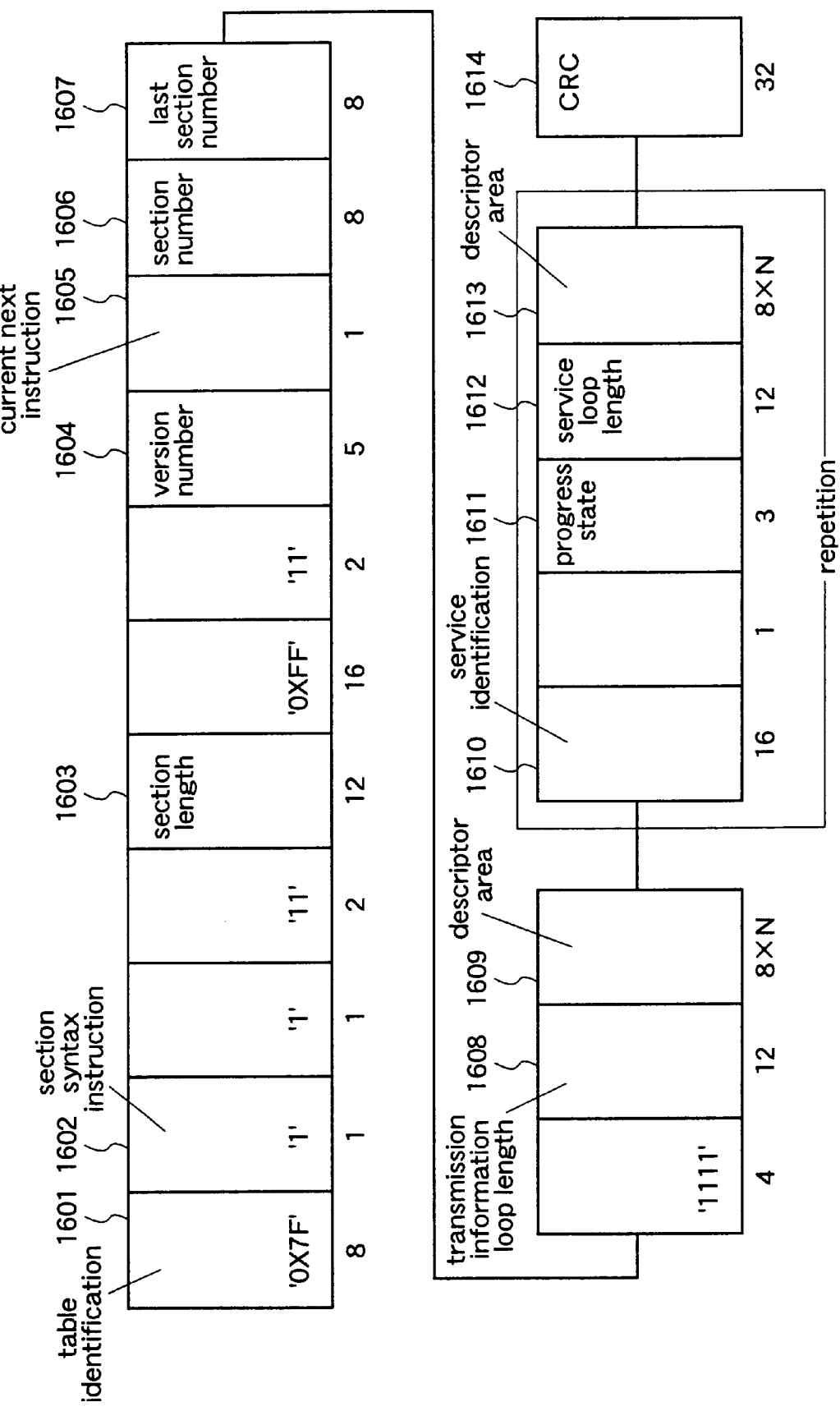
FIG. 19 is an explanatory diagram illustrating a data structure of a SIT.

FIG. 19 illustrates a data structure of the above-described SIT. The SIT includes information 1601 for identifying a table, information 1602 for indicating a section syntax, information 1603 for showing a section length, information 1604 for showing a version number, information 1605 for showing a current next instruction, information 1606 for showing a section number, information 1607 for showing a last section number, information 1608 for showing a transmission information loop length, an area 1609 for a descriptor, information 1610 for a service identification, information 1611 for showing a progress state, information 1612 for showing a service loop length, an area 1613 for a descriptor, an area 1614 for a CRC, and the like.

As examples of a descriptor to be described in the SIT, the following are cited:

That is, discrimination of broadcasting distributors, control of the reproduction of a VTR, display of a channel barner of EPG, display of broadcast contents, and the like.

Among these descriptors, interactive program control information corresponds to a "player", and it interprets "programming" which is transmitted by a transport stream on the basis of the flow of time made by absolute time information that is included in a flag to be used by using an interpreter which is realized by programming of the CPU in the receiving unit.

This "programming" can, for example, realize a simple moving image reproduction of moving a simple moving image in the background of a still picture, or an interactive exchange of a viewer's responding to a questionnaire which is sent by a broadcasting station.

This "programming" creates an image that is moved on the basis of the flow of time made by the absolute time information that is transmitted by a transport stream.

Here, the broadcasting station transmits the absolute time information as time information because, there generally is a possibility of a time lag from the ground time in the satellite digital broadcasting. Accordingly, the broadcasting station transmits the time as a reference for processing by the receiving apparatus.

FIGS. 2 to 11 each represent variations of the receiving unit, the recording unit, and the reproducing unit.

Figure 2:
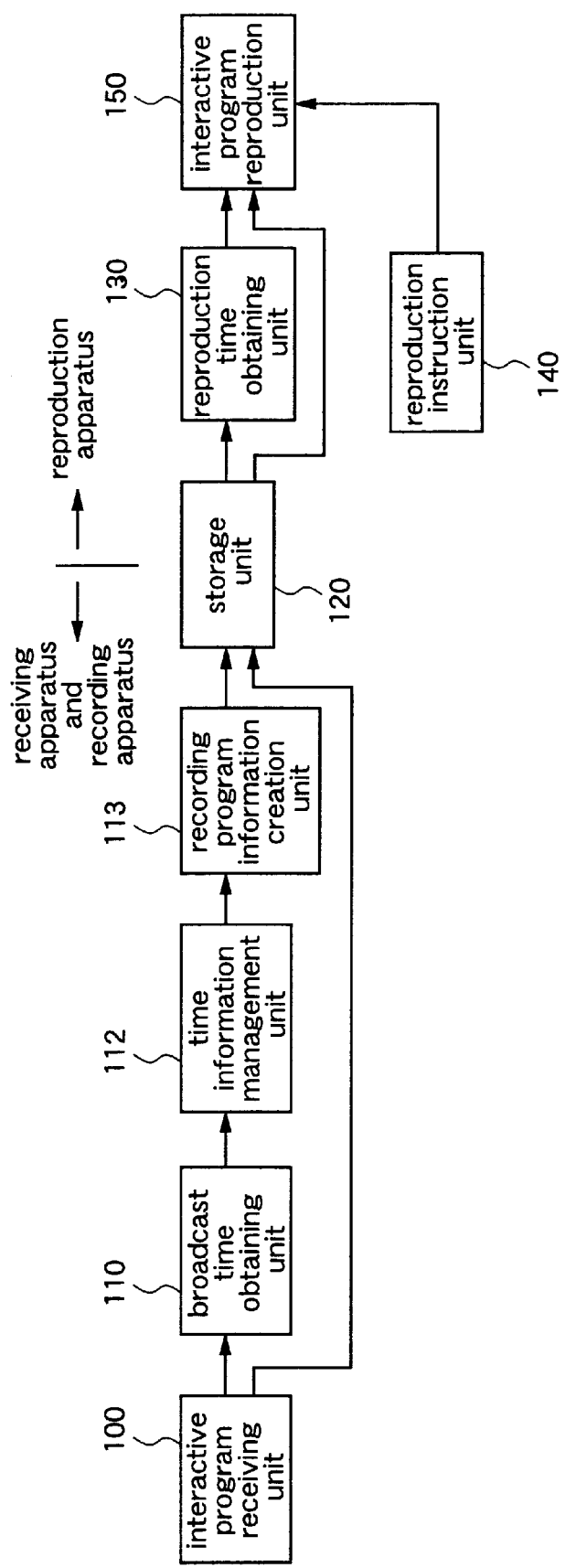
FIG. 2 is a block diagram representing a variation of the receiving apparatus, the recording apparatus, and the reproduction apparatus of FIG. 1.

First, an apparatus shown in FIG. 2 does not manipulate contents of a service (program) and writes these contents and absolute time information on a tape. Then, at the reproduction time, the apparatus of FIG. 2 reproduces the contents on the basis of the absolute time information that is recorded on the tape.

In FIG. 2, numeral 100 denotes an interactive program receiving unit for receiving interactive program broadcasting which includes an absolute time in a (TDT) Time and Data Table and at least one of video and audio and interactive programming as a part of the broadcasting in which the absolute time is indicated therein. Numeral 110 denotes a broadcast time obtaining unit for obtaining information of the absolute time when the broadcasting is to be performed, and managing the absolute time information. Numeral 112 denotes a time information management unit for recording the absolute time information that is obtained by the broadcast time obtaining unit 110, which absolute time information is recorded from the TDT, in a first descriptor of a SIT. Numeral 113 denotes a recording program information creation unit for creating a SIT as program information for the recording of the interactive program. Numeral 120 denotes a storage unit for storing the interactive program that is received by the interactive program receiving unit 100 in a recording area on a recording medium, and for recording the absolute time information that is obtained from the first descriptor in the SIT, in another area on the recording medium or in a recording apparatus. Numeral 130 denotes a reproduction time obtaining unit for receiving the absolute time information that is stored in the storage unit 120, and reproducing a flow of time in the recording. Numeral 140 denotes a reproduction instruction unit for detecting whether the interactive program is recorded in the storage unit 120, and issuing a reproduction instruction automatically or in accordance with an instruction by a user. Numeral 150 denotes an interactive program execution unit for receiving the reproduction instruction from the reproduction instruction unit 140 and for receiving the interactive program from the storage unit 120 to thereby execute the interactive program on the basis of the absolute time that is obtained from the reproduction time obtaining unit 130.

Next, the operation of the apparatus of FIG. 2 will be described. The interactive program receiving unit 100 corresponds to the CS antenna 1, the receiving unit 2, and the transport decoder 3 in FIG. 1. The interactive program receiving unit 100 selects an interactive program from an MPEG transport stream that is transmitted by the broadcasting station. The broadcast time obtaining unit 110 corresponds to the CPU 8 in FIG. 1. The broadcast time obtaining unit 110 extracts the absolute time information from the TDT of the MPEG transport stream that is transmitted by the broadcasting station, and manages the absolute time information.

The time information management unit 112 corresponds to the CPU 8 in FIG. 1, and the time information management unit 112 records the absolute time information, which is recorded from the TDT, that is obtained by the broadcast time obtaining unit 110 in the first descriptor in the SIT.

The recording program information creation unit 113 corresponds to the CPU 8 in FIG. 1, and the recording information creation unit 113 creates the SIT as program information for the recording of the interactive program.

The storage unit 120 corresponds to the DVHS recording/reproduction apparatus 12 in FIG. 1, and the storage unit 120 records the MPEG transport stream that is transmitted by the broadcasting station together with the absolute time information that is obtained by the broadcast time obtaining unit 110 on a VHS video cassette, as it is in the digital format. At that time, the time information to be recorded is input to the first descriptor in the SIT. Accordingly, even when a program requires time information, such as when the programming of the interactive program is included in the MPEG transport stream, such a program can be recorded without a hitch.

The reproduction instruction unit 140 corresponds to a so-called remote control apparatus or the CPU 8 in FIG. 1, and the reproduction instruction unit 140 detects whether the interactive program is recorded in the storage unit 120 and issues the reproduction instruction automatically or in accordance with an instruction by a user.

The reproduction time obtaining unit 130 corresponds to the CPU 8 in FIG. 1, and the reproduction time obtaining unit 130 reproduces the time information that is reproduced from the storage unit 120 at the reproduction time.

The interactive program reproduction unit 150 corresponds to the CPU 8 in FIG. 1, and the interactive program reproduction unit 150 interprets the programming of the interactive program that is included in the MPEG transport stream, which is reproduced from the storage unit 120, in accordance with an instruction of the reproduction instruction unit 140, by an interpreter realized by programming of the CPU 8. Thereby, the interactive program reproduction unit 150 can reproduce the so-called interactive program of displaying an image including a question which is previously prepared by the broadcasting station, thereby making a viewer respond to the question by a remote control operation or the like, and the interactive program reproduction unit 150 can transmit the response to the broadcasting station.

In this apparatus shown in FIG. 2, the absolute time information included in the MPEG transport stream is written on the tape, whereby the interactive program can be reproduced. However, the reproduction cannot be executed by utilizing the time information.

In this case, this programming of the interactive program is one which supports video and can realize a display of simple graphics or number inputting.

In the apparatus of FIG. 2, the absolute time information is recorded in the first descriptor of the SIT, which can record only the absolute time. However, the absolute time information can be recorded in a second descriptor which can record both the absolute time and a relative time from the starting (beginning) of the program.

In addition, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself. Here, the another recording area on the DVHS cassette tape, the DVC cassette memory, and the memory of the DVHS deck can record both the absolute time and the relative time from the beginning of the program.

Figure 3:
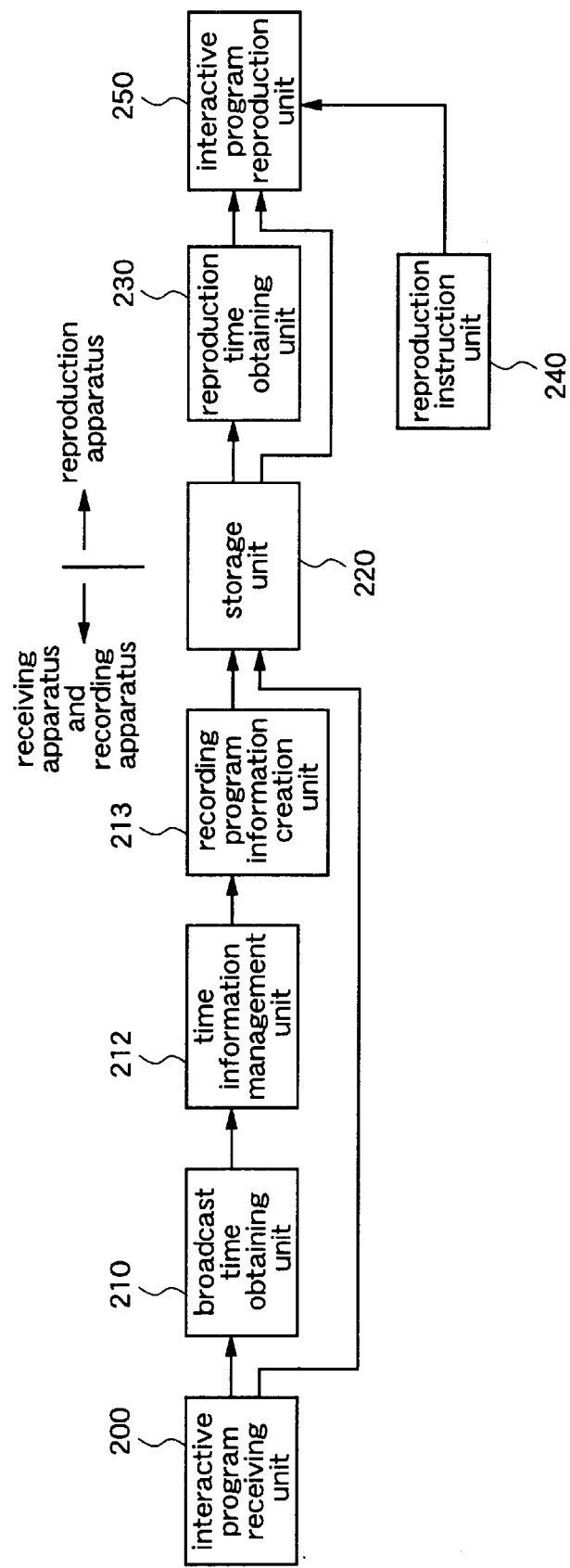
FIG. 3 is a block diagram representing a variation of the receiving apparatus, the recording apparatus, and the reproduction apparatus of FIG. 1.

An apparatus shown in FIG. 3 does not manipulate contents of a service (program) and writes these contents and absolute time information on a tape. Then, at the reproduction time, the apparatus of FIG. 3 reproduces the contents on the basis of the absolute time information that is recorded on the tape.

This apparatus corresponds to the apparatus shown in FIG. 2. However, while the apparatus of FIG. 2 utilizes the absolute time information transmitted by the TDT of the MPEG transport stream, the apparatus of FIG. 3 utilizes absolute time information that is transmitted in ordinary transmission formats that are not particularly limited to the TDT.

In FIG. 3, numeral 200 denotes an interactive program receiving unit for receiving interactive program broadcasting which includes an absolute time and at least one of video and audio and interactive programming as a part of the broadcasting in which the absolute time is indicated therein. Numeral 210 denotes a broadcast time obtaining unit for obtaining information of the absolute time when the broadcasting is to be performed, and for managing the absolute time information. Numeral 212 denotes a time information management unit for performing management in the recording of the absolute time information that is obtained by the broadcast time obtaining unit 210. Numeral 213 denotes a recording program information creation unit for creating program information for the recording of the interactive program. Numeral 220 denotes a storage unit for storing the interactive program that is received by the interactive program receiving unit 200 in a recording area on a recording medium, and for recording the absolute time information in another area on the recording medium or in a recording apparatus. Numeral 230 denotes a reproduction time obtaining unit for receiving the absolute time information that is stored in the storage unit 220, and for reproducing a flow of time in the recording. Numeral 240 denotes a reproduction instruction unit for detecting whether the interactive program is recorded in the storage unit 220, and for issuing a reproduction instruction automatically or in accordance with an instruction by a user. Numeral 250 denotes an interactive program execution unit for receiving the reproduction instruction from the reproduction instruction unit 240 and for receiving the interactive program from the storage unit 220 to thereby execute the interactive program on the basis of the absolute time that is obtained from the reproduction time obtaining unit 230.

Next, the operation apparatus of FIG. 3 will be described. The interactive program receiving unit 200 corresponds to the CS antenna 1, the receiving unit 2, and the transport decoder 3 in FIG. 1, and the, interactive program receiving unit 200 selects an interactive program from a data stream that is transmitted by the broadcasting station. The broadcast time obtaining unit 210 corresponds to the CPU 8 in FIG. 1, and the broadcast time obtaining unit 210 extracts the absolute time information from the data stream that is transmitted by the broadcasting station, and manages the absolute time information.

The time information management unit 212 corresponds to the CPU 8 in FIG. 1, and the time information management unit 212 performs management in the recording of the absolute time information that is obtained by the broadcast time obtaining unit 210.

The recording program information creation unit 213 corresponds to the CPU 8 in FIG. 1 , and the recording program information creation unit 213 creates the program information for the recording of the interactive program.

The storage unit 220 corresponds to the DVHS recording/reproduction apparatus 12 in FIG. 1, and the storage unit 220 records the data stream that is transmitted by the broadcasting station together with the absolute time information obtained by the broadcast time obtaining unit 210 on a VHS video cassette, as it is in the digital format. At that time, the time information to be recorded is input to a first area in a recording format of the VHS video cassette. Thereby, even when a program requires the time information, such as when the programming of the interactive program is included in the data stream from the broadcasting station, such a program can be recorded without a hitch.

The reproduction instruction unit 240 corresponds to a so-called remote control apparatus or the CPU 8 in FIG. 1, and the reproduction instruction unit 240 detects whether the interactive program is recorded in the storage unit 220 and issues the reproduction instruction automatically or in accordance with an instruction by a user.

The reproduction time obtaining unit 230 corresponds to the CPU 8 in FIG. 1, and the reproduction time obtaining unit 230 reproduces the time information that is reproduced from the storage unit 220 at the reproduction time.

The interactive program reproduction unit 250 corresponds to the CPU 8 in FIG. 1, and the interactive program reproduction unit 250 interprets the programming of the interactive program that is included in the data stream which is reproduced from the storage unit 220, in accordance with an instruction of the reproduction instruction unit 240, by an interpreter which is realized by programming of the CPU 8. Thereby, the interactive program reproduction unit 250 can reproduce the so-called interactive program of displaying an image including a question which is previously prepared by the broadcasting station, thereby making a viewer respond to the question by a remote control operation or the like, and the interactive program reproduction unit 250 can transmit the response to the broadcasting station.

In this apparatus shown in FIG. 3, the absolute time information included in the data stream is written on the tape, whereby the interactive program can be reproduced. However, the reproduction cannot be executed by utilizing the time information.

In addition, information is recorded in another recording area on the tape of a DVHS cassette or the like. However, the program information can be recorded in a recording apparatus such as a memory other than the tape of a DVC or the like, or in a memory of a recording/reproduction apparatus such as a DVHS deck itself. Here, the another recording area on the DVHS cassette tape, the DVC cassette memory, and the memory of the DVHS deck can record both the absolute time and the relative time from the beginning of the program.

Figure 4:
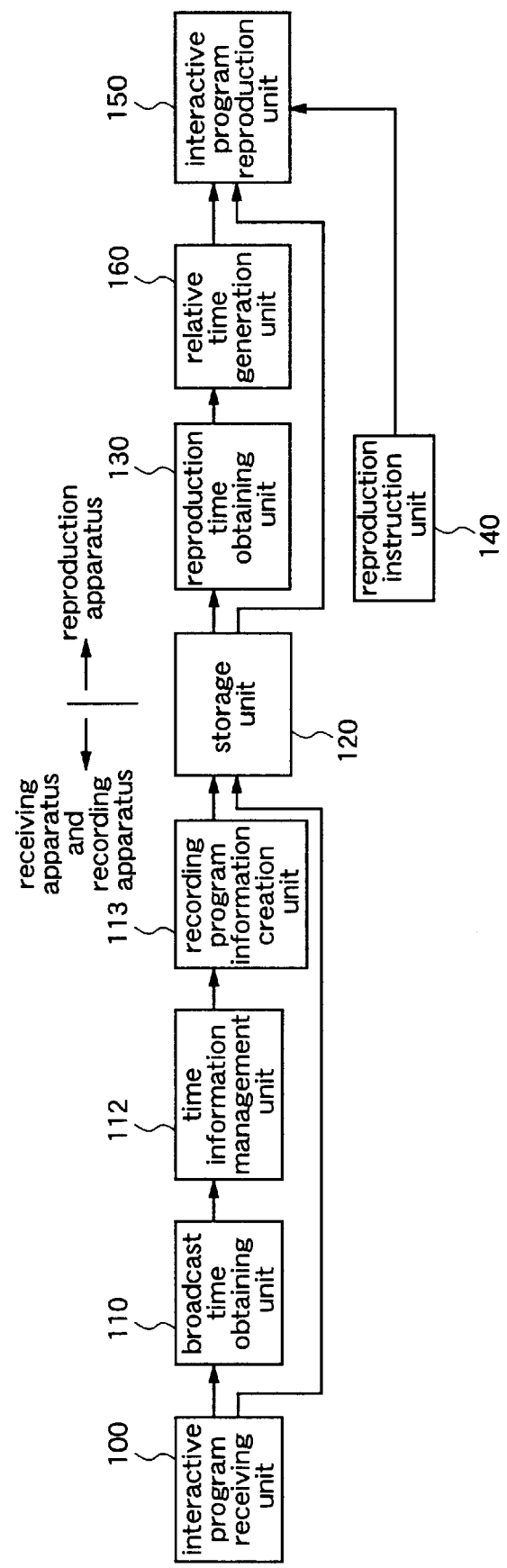
FIG. 4 is a block diagram representing a variation of the receiving apparatus, the recording apparatus, and the reproduction apparatus of FIG. 1.

In addition, an apparatus shown in FIG. 4 does not manipulate contents of a service (program) and writes these contents and absolute time information on a tape. Then, at the reproduction time, the apparatus of FIG. 4 generates relative time information on the basis of the absolute time information that is recorded on the tape, and reproduces the contents on the basis of the relative time information.

In FIG. 4, numeral 100 denotes an interactive program receiving unit for receiving interactive program broadcasting which includes an absolute time in a TDT and at least one of video and audio and an interactive program as a part of the broadcasting in which the absolute time is indicated therein. Numeral 110 denotes a broadcast time obtaining unit for obtaining information of the absolute time when the broadcasting is to be performed, and for managing the absolute time information. Numeral 112 denotes a time information management unit for recording the absolute time information that is obtained by the broadcast time obtaining unit 110, which absolute time information is recorded from the TDT, in a first descriptor in a SIT. Numeral 113 denotes a recording program information creation unit for creating a SIT as program information for the recording of the interactive program. Numeral 120 denotes a storage unit for storing the interactive program received by the interactive program receiving unit 100 in a recording area on a recording medium, and for recording the absolute time information that is obtained from the first descriptor in the SIT in another area on the recording medium or in a recording apparatus. Numeral 130 denotes a reproduction time obtaining unit for receiving the absolute time information that is stored in the storage unit 120. Numeral 160 denotes a relative time generation unit for generating relative time information on the basis of the absolute time information that is obtained by the reproduction time obtaining unit 130. Numeral 140 denotes a reproduction instruction unit for detecting whether the interactive program is recorded in the storage unit 120, and for issuing a reproduction instruction automatically or in accordance with an instruction by a user. Numeral 150 denotes an interactive program execution unit for receiving the reproduction instruction from the reproduction instruction unit 140 and for receiving the interactive program from the storage unit 120 to thereby execute the interactive program on the basis of the relative time that is obtained from the relative time generation unit 160.

Next, the operation of the apparatus of FIG. 4 will be described. The interactive program receiving unit 100 corresponds to the CS antenna 1, the receiving unit 2, and the transport decoder 3 in FIG. 1, and the program receiving unit 100 selects an interactive program from an MPEG transport stream that is transmitted by the broadcasting station. The broadcast time obtaining unit 110 corresponds to the CPU 8 in FIG. 1, and the broadcasting time obtaining unit 110 extracts the absolute time information from the TDT of the MPEG transport stream that is transmitted by the. broadcasting station, and manages the absolute time information.

The time information management unit 112 corresponds to the CPU 8 in FIG. 1, and the time information management unit 112 records the absolute time information obtained by the broadcast time obtaining unit 110, which absolute time information is recorded from the TDT, in the first descriptor in the SIT.

The recording program information creation unit 113 corresponds to the CPU 8 in FIG. 1, and the recording program information creation unit 113 creates the SIT as program information for the recording of the interactive program.

The storage unit 120 corresponds to the DVHS recording/reproduction apparatus 12 in FIG. 1, and the storage unit 120 records the MPEG transport stream that is transmitted by the broadcasting station together with the absolute time information that is obtained by the broadcast time obtaining unit 110 on a VHS video cassette as it is in the digital format. At that time, the time information to be recorded is input to the first descriptor in the SIT. Accordingly, even when a program requires time information, such as when the programming of the interactive program is included in the MPEG transport stream, such a program can be recorded without a hitch.

The reproduction instruction unit 140 corresponds to a so-called remote control apparatus or the CPU 8 in FIG. 1, and the reproduction instruction unit 140 detects whether the interactive program is recorded in the storage unit 120, and issues the reproduction instruction automatically or in accordance with an instruction by a user.

The reproduction time obtaining unit 130 corresponds to the CPU 8 in FIG. 1, and the reproduction time obtaining unit 130 obtains the absolute time information that is reproduced from the storage unit 120 at the reproduction time.

The relative time generation unit 160 corresponds to the CPU 8 in FIG. 1, and the relative time generation unit 160 obtains the relative time information on the basis of the absolute time information that is obtained by the reproduction time obtaining unit 130.

The interactive program reproduction unit 150 corresponds to the CPU 8 in FIG. 1, and, in accordance with an instruction of the reproduction instruction unit 140, the interactive program reproduction unit 150 interprets the programming of the interactive program that is included in the MPEG transport stream which is reproduced from the storage unit 120, on the basis of the relative time information that is generated by the relative time generation unit 160, by an interpreter which is realized by programming of the CPU 8. Thereby, the interactive program reproduction unit 160 can reproduce the so-called interactive program of displaying an image including a question which is previously prepared by the broadcasting station, thereby making a viewer respond to the question by a remote control operation or the like, and the interactive program reproduction unit 160 can transmit the response to the broadcasting station.

In this apparatus shown in FIG. 4, the absolute time information that is included in the MPEG transport stream is written on the tape, whereby the interactive program can be reproduced. However, the reproduction cannot be executed by utilizing the time information.

In this case, this programming of the interactive program is one which supports video and which can realize a display of simple graphics or number inputting.

In the apparatus of FIG. 4, the absolute time information is recorded in the first descriptor in the SIT, where the first descriptor can record only the absolute time. However, the absolute time information can be recorded in a second descriptor which can record both of the absolute time and the relative time from the beginning of the program.

Further, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself. Here, the another recording area on the DVHS cassette tape, the DVC cassette memory, and the memory of the DVHS deck can record both of the absolute time and the relative time from the beginning of the program.

Figure 5:
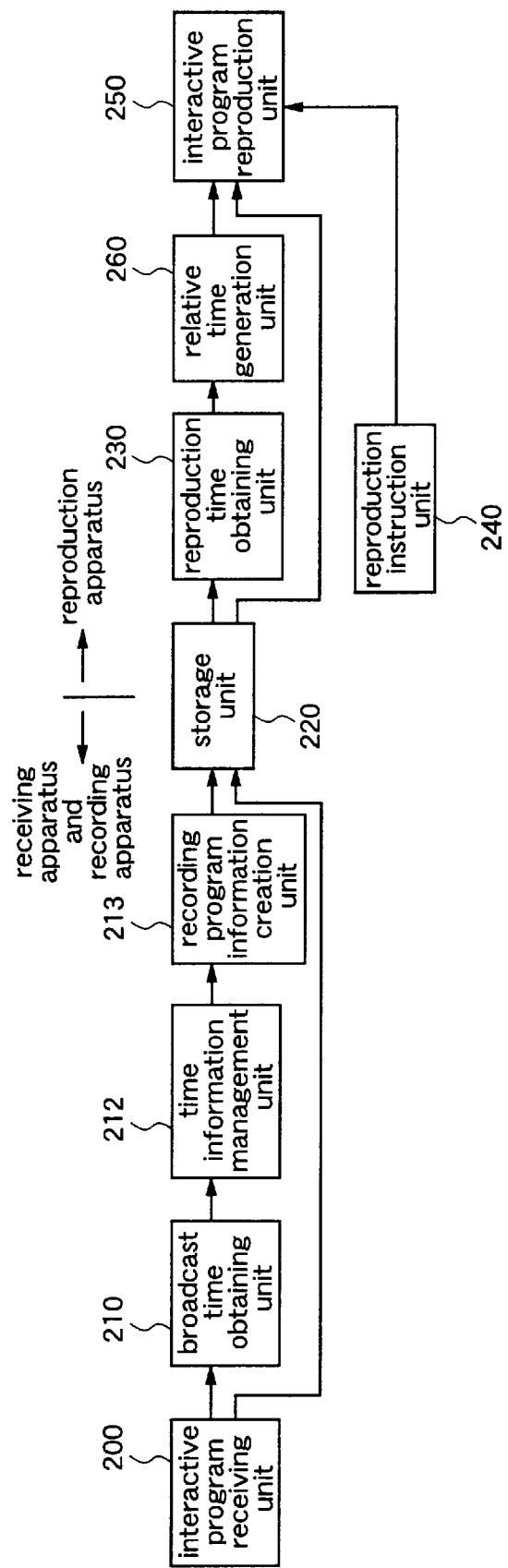
FIG. 5 is a block diagram representing a variation of the receiving apparatus, the recording apparatus, and the reproduction apparatus of FIG. 1.

An apparatus shown in FIG. 5 does not manipulate contents of a service (program) and writes these contents and absolute time information on a tape. Then, at the reproduction time, the apparatus of FIG. 5 generates relative time information from the absolute time information that is recorded on the tape, and reproduces the contents on the basis of the relative time information. This apparatus corresponds to the apparatus of FIG. 4. However, while the apparatus of FIG. 4 utilizes the absolute time information transmitted by the TDT of the MPEG transport stream, the apparatus of FIG. 5 utilizes absolute time information that is transmitted in ordinary transmission formats that are not particularly limited to the TDT.

In FIG. 5, numeral 200 denotes an interactive program receiving unit for receiving interactive program broadcasting which includes an absolute time and at least one of video and audio and interactive programming as a part of the broadcasting in which the absolute time is indicated therein. Numeral 210 denotes a broadcast time obtaining unit for obtaining information of the absolute time when the broadcasting is to be performed, and for managing the absolute time information. Numeral 212 denotes a time information management unit for performing management in the recording of the absolute time information that is obtained by the broadcast time obtaining unit 210. Numeral 213 denotes a recording program information creation unit for creating program information for the recording of the interactive program. Numeral 220 denotes a storage unit for storing the interactive program that is received by the interactive program receiving unit 200 in a recording area on a recording medium, and for recording the absolute time information in another area on the recording medium or in a recording apparatus. Numeral 230 denotes a reproduction time obtaining unit for obtaining the absolute time information that is stored in the storage unit 220. Numeral 260 denotes a relative time generation unit for generating relative time information on the basis of the absolute time information that is obtained by the reproduction time obtaining unit 230. Numeral 240 denotes a reproduction instruction unit for detecting whether the interactive program is recorded in the storage unit 220, and for issuing a reproduction instruction automatically or in accordance with an instruction by a user. Numeral 250 denotes an interactive program execution unit for receiving the reproduction instruction from the reproduction instruction unit 240 and for receiving the interactive program from the storage unit 220 to thereby execute the interactive program on the basis of the relative time that is obtained by the relative time generation unit 260.

Next, the operation of the apparatus of FIG. 5 will be described. The interactive program receiving unit 200 corresponds to the CS antenna 1, the receiving unit 2, and the transport decoder 3 in FIG. 1, and the interactive program receiving unit 200 selects an interactive program from a data stream that is transmitted by the broadcasting station. The broadcast time obtaining unit 210 corresponds to the CPU 8 in FIG. 1, and the broadcast time obtaining unit 210 extracts the absolute time information from the data stream that is transmitted by the broadcasting station, and manages the absolute time information.

The time information management unit 212 corresponds to the CPU 8 in FIG. 1, and the time information management unit 212 performs management in the recording of the absolute time information that is obtained by the broadcast time obtaining unit 210.

The recording program information creation unit 213 corresponds to the CPU 8 in FIG. 1, and the recording program information creation unit 213 creates the program information for the recording of the interactive program.

The storage unit 220 corresponds to the DVHS recording/reproduction apparatus 12 in FIG. 1, and the storage unit 220 records the data stream that is transmitted by the broadcasting station, together with the absolute time information that is obtained by the broadcast time obtaining unit 210 on a VHS video cassette, as it is in the digital format. At that time, the time information to be recorded is input to a first area in a recording format of the VHS video cassette. Accordingly, even when a program requires the time information, such as when the programming of the interactive program is included in the data stream from the broadcasting station, such a program can be recorded without a hitch.

The reproduction instruction unit 240 corresponds to a so-called remote control apparatus or the CPU 8 in FIG. 1, and the reproduction instruction unit 240 detects whether the interactive program is recorded in the storage unit 220 and issues the reproduction instruction automatically or in accordance with an instruction by a user.

The reproduction time obtaining unit 230 corresponds to the CPU 8 in FIG. 1, and the reproduction time obtaining unit 230 obtains the absolute time information that is reproduced from the, storage unit 220 at the reproduction time.

The relative time generation unit 260 corresponds to the CPU 8 in FIG. 1, and the relative time generation unit 260 generates relative time information on the basis of the absolute time information that is obtained by the reproduction time obtaining unit 230.

The interactive program reproduction unit 250 corresponds to the CPU 8 in FIG. 1, and the interactive program reproduction unit 250 interprets the programming of the interactive program that is included in the data stream reproduced from the storage unit 220, in accordance with an instruction of the reproduction instruction unit 240, on the basis of the relative time information that is generated by the relative time generation unit 260 by using an interpreter realized by programming of the CPU 8. Thereby, the interactive program reproduction unit 250 can reproduce the so-called interactive program of displaying an image including a question which is previously prepared by the broadcasting station, thereby making a viewer respond to the question by a remote control operation or the like, and the interactive program reproduction unit 250 can transmit the response to the broadcasting station.

In this apparatus shown in FIG. 5, the absolute time information that is included in the data stream is written on a tape, whereby the interactive program can be reproduced. Further, the relative time information is generated at the reproduction time, whereby the reproduction can be executed at an arbitrary time.

In addition, information is recorded in another recording area on the tape of a DVHS cassette or the like. However, the information can be recorded in a recording apparatus such as a memory other than the tape of a DVC or the like, or in a memory of a recording/reproduction apparatus such as a DVHS deck itself. Here, the another recording area on the DVHS cassette tape, the DVC cassette memory, and the memory of the DVHS deck can record both the absolute time and the relative time from the beginning of the program.

Figure 6:
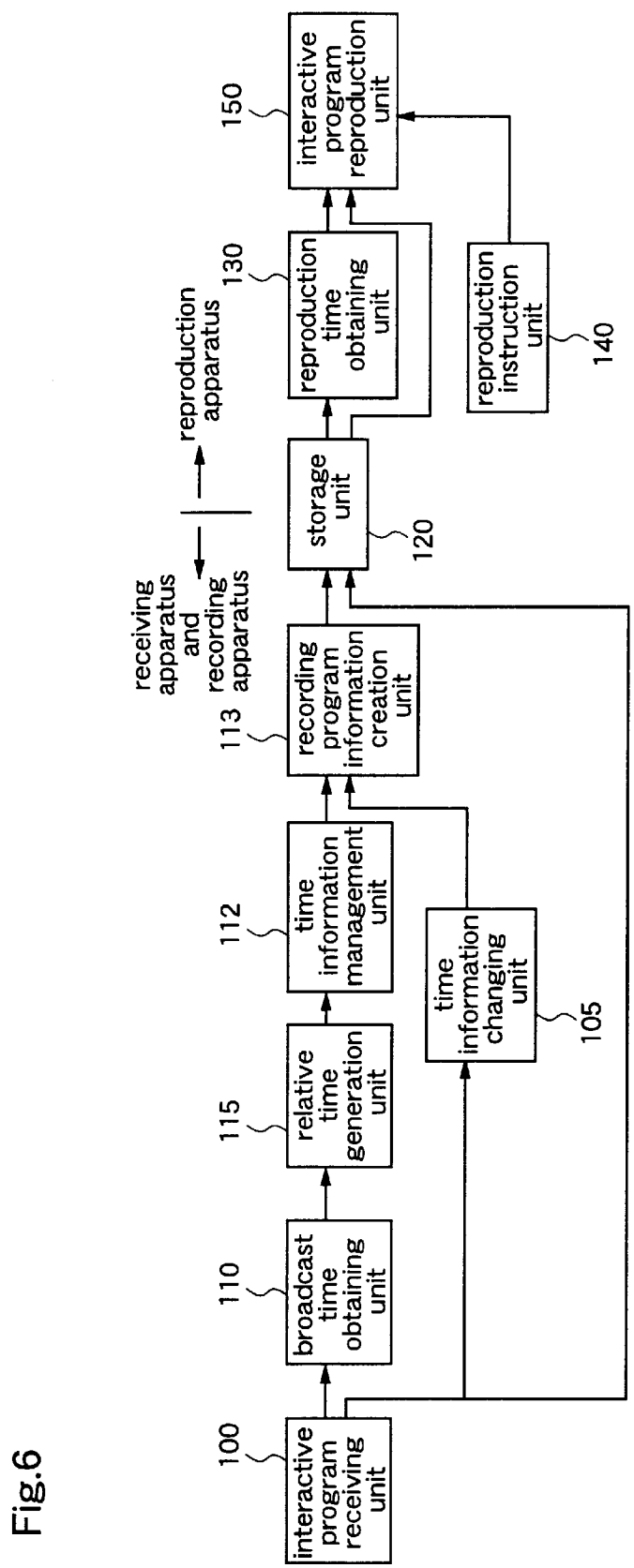
FIG. 6 is a block diagram representing a variation of the receiving apparatus, the recording apparatus, and the reproduction apparatus of FIG. 1.

An apparatus shown in FIG. 6 changes the absolute time information of contents of a service (program) into a relative time from the beginning of the program, and writes the contents after changing the time information and an elapsed time of the program on a tape. Then, at the reproduction time, the apparatus reproduces the contents on the basis of the relative time information recorded on the tape.

In FIG. 6, numeral 100 denotes an interactive program receiving unit for receiving interactive program broadcasting which includes an absolute time when the broadcasting is to be executed in a TDT and video and audio and interactive programming as a part of the broadcasting, which are designated by the absolute time. Numeral 105 denotes a time information changing unit for changing the absolute time information of the interactive program that is received by the interactive program receiving unit 100 into a relative time from a start time of the program. Numeral 110 denotes a broadcast time obtaining unit for obtaining information of a time when the broadcasting is to be performed, and for managing the time information. Numeral 115 denotes a relative time generation unit for generating a relative time from the starting (beginning) of the interactive program on the basis of the start time of the interactive program and the absolute time information that is obtained by the broadcast time obtaining unit 110. Numeral 112 denotes a time information management unit for recording the relative time information, which is recorded from the absolute time information that is obtained by the broadcast time obtaining unit 110, in a second descriptor of a SIT. Numeral 113 denotes a recording program information creation unit for creating a SIT as program information for the recording of the interactive program, and for recording the relative time information, which is obtained by writing the time information by the time information writing unit 105, in the SIT. Numeral 120 denotes a storage unit for storing the interactive program in an area on a recording medium, and for storing the relative time in the SIT that is created by the recording program information creation unit 113. Numeral 130 denotes a reproduction time obtaining unit for reproducing the relative time information which is reproduced from the SIT on the recording medium of the storage unit 120, and for obtaining the relative time information. Numeral 140 denotes a reproduction instruction unit for detecting whether the interactive program is recorded in the storage unit 120, and for issuing a reproduction instruction automatically or in accordance with an instruction by a user. Numeral 150 denotes an interactive program reproduction unit for receiving the reproduction instruction from the reproduction instruction unit 140 and for receiving the interactive program from the storage unit 120 to thereby execute the interactive program on the basis of the relative time information that is obtained by the reproduction time obtaining unit 130.

Next, the operation of the apparatus of FIG. 6 will be described. The interactive program receiving unit 100 corresponds to the CS antenna 1, the receiving unit 2, and the transport decoder 3 in FIG. 1, and the interactive program receiving unit 100 selects an interactive program from the MPEG transport stream that is transmitted by a broadcasting station.

The time information changing unit 105 corresponds to the CPU 8 in FIG. 1, and the time information changing unit 105 changes the absolute time information of the interactive program, which absolute time information is included in the TDT of the MPEG transport stream, into the relative time from the starting time of the program.

The broadcast time obtaining unit 110 corresponds to the CPU 8 in FIG. 1, and the broadcast time obtaining unit 110 extracts the absolute time information from the TDT of the MPEG transport stream that is transmitted by the broadcasting station, and manages the absolute time information.

The relative time generation unit 115 corresponds to the composition unit 11 in FIG. 1, and the relative time generation unit 115 generates relative time information from the beginning of the interactive program, on the basis of the start time of the interactive program and the absolute time information that is obtained by the broadcast time obtaining unit 110.

The time information management unit 112 corresponds to the CPU 8 in FIG. 1, and the time information management unit 112 records the relative time information which is recorded from the absolute time information that is obtained by the broadcast time obtaining unit 110, in the second descriptor of the SIT.

The recording program information creation unit 113 corresponds to the CPU 8 in FIG. 1, and the recording program information creation unit 113 creates the SIT as the program information for the recording of the interactive program, and records the relative time information, which is changed from the absolute time information by the time information changing unit 105, on the SIT.

The storage unit 120 corresponds to the DVHS recording/reproduction apparatus 12 in FIG. 1, and the storage unit 120 records the MPEG transport stream that is transmitted by the broadcasting station together with the relative time information that is generated by the relative time generation unit 115 on a VHS video cassette, as it is in the digital format. At that time, the relative time information is recorded in the second descriptor of the SIT. Thereby, even when a program requires time information, such as when the programming of the interactive program is included in the MPEG transport stream, such a program can be reproduced without a hitch.

The reproduction instruction unit 140 corresponds to a so-called remote control apparatus or the CPU 8 in FIG. 1, and the reproduction instruction unit 140 detects whether the interactive program is recorded in the storage unit 120 and issues the reproduction instruction automatically or in accordance with an instruction by the user.

The reproduction time obtaining unit 130 corresponds to the CPU 8 in FIG. 1, and the reproduction time obtaining unit 130 reproduces the relative time information which is reproduced from the storage unit 120.

The interactive program reproduction unit 150 corresponds to the CPU 8 in FIG. 1, and the interactive program reproduction unit 150 interprets the programming of the interactive program that is included in the MPEG transport stream which is reproduced from the storage unit 120, in accordance with an instruction of the reproduction instruction unit 140, by an interpreter which is realized by programming of the CPU 8. Thereby, the interactive program reproduction unit 150 can reproduce the so-called interactive program of displaying an image including a question which is previously prepared by the broadcasting station, thereby making a viewer respond to the question by a remote control operation or the like, and the interactive program reproduction unit 150 can transmit the response to the broadcasting station.

In this apparatus of FIG. 6, the absolute time information that is included in the MPEG transport stream is changed into the relative time information, and the relative time information as the elapsed time of the program is written on the tape. Thereby, the interactive program can be reproduced even at a time having an absolute time which is different from the absolute time in the recording.

In addition, in the apparatus of FIG. 6, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself.

Figure 7:
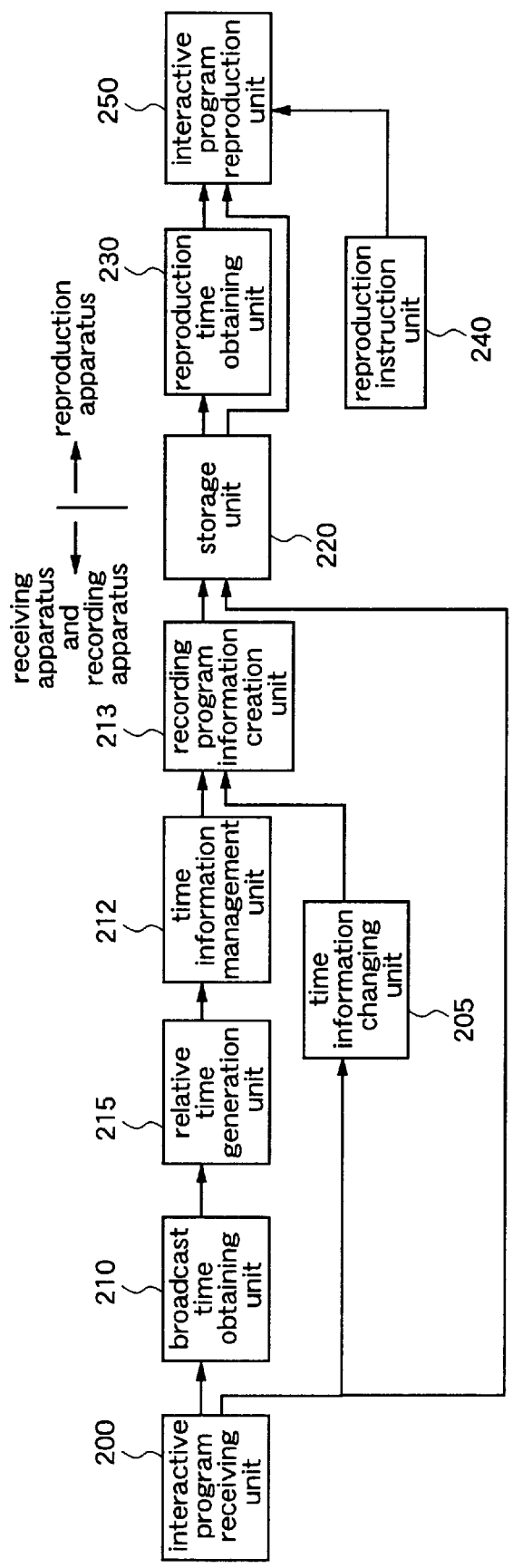
FIG. 7 is a block diagram representing a variation of the receiving apparatus, the recording apparatus, and the reproduction apparatus of FIG. 1.

An apparatus shown in FIG. 7 changes absolute time information of contents of a service (program) into a relative time from the beginning of the program, and writes the contents, after changing the absolute time information, and an elapsed time of the program on a tape. Then, at the reproduction time, the apparatus of FIG. 7 reproduces the contents on the basis of the relative time information recorded on the tape.

This apparatus corresponds to the apparatus of FIG. 6. However, while the apparatus of FIG. 6 utilizes the absolute time information transmitted by the TDT of the MPEG transport stream, the apparatus of FIG. 7 utilizes absolute time information transmitted in ordinary transmission formats that are not particularly limited to the TDT.

In FIG. 7, numeral 200 denotes an interactive program receiving unit for receiving interactive program broadcasting which includes an absolute time when the broadcasting is to be executed, video and audio, and interactive programming, which are designated by the absolute time, as a part of the broadcasting. Numeral 205 denotes a time information changing unit for changing the absolute time information of the interactive program that is received by the interactive program receiving unit 200 into a relative time from a start time of the program. Numeral 210 denotes a broadcast time obtaining unit for obtaining information of a time when the broadcasting is to be executed, and for managing the time information. Numeral 215 denotes a relative time generation unit for generating a relative time from the beginning of the interactive program on the basis of a start time of the interactive program and the absolute time information that is obtained by the broadcast time obtaining unit 210. Numeral 212 denotes a time information management unit for recording relative time information which is recorded from the absolute time information obtained by the broadcast time obtaining unit 210. Numeral 213 denotes a recording program information creation unit for creating program information for the recording of the interactive program, and for recording the relative time information, which is obtained by changing time information by the time information changing unit 205, on the program information.

Numeral 220 denotes a storage unit for storing the interactive program in an area on a recording medium, and for storing the relative time that is generated by the time generation unit 215 in another area on the recording medium or in a recording apparatus. Numeral 230 denotes a reproduction time obtaining unit for receiving the relative time information that is stored in the storage unit 220, and for reproducing a flow of time in the recording. Numeral 240 denotes a reproduction instruction unit for detecting whether the interactive program is recorded in the storage unit 220, and for issuing a reproduction instruction automatically or in accordance with an instruction by a user. Numeral 250 denotes an interactive program reproduction unit for receiving the reproduction instruction from the reproduction instruction unit 240 and for receiving the interactive program from the storage unit 220 to thereby execute the interactive program on the basis of the relative time that is obtained by the reproduction time obtaining unit 230.

Next, the operation of the apparatus of FIG. 7 will be described. The interactive program receiving unit 200 corresponds to the CS antenna 1, the receiving unit 2, and the transport decoder 3 in FIG. 1, and the interactive program receiving unit 200 selects an interactive program from an MPEG transport stream that is transmitted by the broadcasting station.

The time information changing unit 205 corresponds to the CPU 8 in FIG. 1, and the time information changing unit 205 changes the absolute time information of the interactive program from the data stream that is transmitted by the broadcasting station into the relative time from the start time of the program.

The broadcast time obtaining unit 210 corresponds to the CPU 8 in FIG. 1, and the broadcast time obtaining unit 210 extracts the absolute time information from the data stream that is transmitted by the broadcasting station, and manages the absolute time information.

The relative time generation unit 215 corresponds to the composition unit 11 in FIG. 1, and the relative time generation unit 215 generates information of a relative time from the beginning of the interactive program on the basis of the start time of the interactive program and the absolute time information that is obtained by the broadcast time obtaining unit 210.

The time information management unit 212 corresponds to the CPU 8 in FIG. 1, and the time information management unit 212 records the relative time information to be recorded, which is generated by the relative time generation unit 215 on the basis of the absolute time information obtained by the broadcast time obtaining unit 210.

The recording program information creation unit 213 corresponds to the CPU 8 in FIG. 1, and the recording program information creation unit 213 creates program information for the recording of the interactive program, and records the relative time information, which is changed by the time information changing unit 205, on the program information.

The storage unit 220 corresponds to the DVHS recording/reproduction apparatus 12 in FIG. 1, and the storage unit 220 records the data stream that is transmitted by the broadcasting station together with the relative time information generated by the relative time generation unit 215 on a VHS video cassette, as it is in the digital format. At that time, the relative time information is recorded in a second area in a recording format of the VHS video cassette. Thereby, even when a program requires time information, such as when the programming of the interactive program is included in the data stream from the broadcasting station, such a program can be recorded without a hitch.

The reproduction instruction unit 240 corresponds to a so-called remote control apparatus or the CPU 8 in FIG. 1, and the reproduction instruction unit 240 detects whether the interactive program is recorded in the storage unit 220 and issues the reproduction instruction automatically or in accordance with an instruction by a user.

The reproduction time obtaining unit 230 corresponds to the CPU 8 in FIG. 1, and the reproduction time obtaining unit 230 reproduces the relative time information that is reproduced from the storage unit 220.

The interactive program reproduction unit 250 corresponds to the CPU 8 in FIG. 1, and the interactive program reproduction unit 250 interprets the programming of the interactive program that is included in the data stream which is reproduced from the storage unit 220, in accordance with an instruction of the reproduction instruction unit 240, by an interpreter which is realized by programming of the CPU 8. Thereby, the interactive program reproduction unit 250 can reproduce the so-called interactive program of displaying an image including a question which is previously prepared by the broadcasting station, thereby making a viewer respond to the question by a remote control operation or the like, and the interactive program reproduction unit 250 can transmit the response to the broadcasting station.

In this apparatus shown in FIG. 7, the absolute time information that is included in the MPEG transport stream is changed into the relative time information, and the relative time information and the elapsed time of the program is written on the tape. Therefore, the interactive program can be reproduced even at a time having an absolute time which is different from the absolute time in the recording.

In addition, in the apparatus of FIG. 7, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself.

An apparatus shown in FIG. 8 does not manipulate contents of a service (program) and writes these contents, absolute time information, and start time information of the program on a tape. Then, at the reproduction time, the apparatus of FIG. 8 obtains relative time information from the absolute time information and the program start time information, both of which are recorded on the tape, and reproduces the contents on the basis of the relative time information.

In FIG. 8, numeral 100 denotes an interactive program receiving unit for receiving interactive program broadcasting including video and audio and an interactive program, as a part of the broadcasting, and a time when the broadcasting is executed which is indicated by a relative time from a start time of the program. Numeral 111 denotes a start time receiving unit for receiving information of a start time of the interactive program. Numeral 110 denotes a broadcast time obtaining unit for obtaining information of a time when the broadcasting is to be performed, and for managing the time information. Numeral 112 denotes a time information management unit for recording the absolute time information that is obtained by the broadcast time obtaining unit 110 and information of a relative time from the start time of the program, which is received by the interactive program receiving unit 100, in a second descriptor of the SIT. Numeral 113 denotes a recording program information creation unit for creating a SIT as program information for the recording of the interactive program, and for recording the start time information of the interactive program in the second descriptor of the SIT. Numeral 120 denotes a storage unit for storing the interactive program which is received by the interactive program receiving unit 100 in a recording area on the recording medium, and for storing the program start time that is obtained from the second descriptor in the SIT, in another area on the recording medium or in a recording apparatus. Numeral 130 denotes a reproduction time obtaining unit for receiving the absolute time information that is stored in the storage unit 120, and for reproducing a flow of time in the recording. Numeral 140 denotes a reproduction instruction unit for detecting whether the interactive program is recorded in the storage unit 120, and for issuing a reproduction instruction automatically or in accordance with an instruction by a user. Numeral 150 denotes an interactive program reproduction unit for receiving the reproduction instruction from the reproduction instruction unit 140 and for receiving the interactive program from the storage unit 120, to thereby execute the interactive program on the basis of the absolute time that is obtained by the reproduction time obtaining unit 130 and the program start time that is obtained from the storage unit 120.

Next, the operation of the apparatus of FIG. 8 will be described. The interactive program receiving unit 100 corresponds to the CS antenna 1, the receiving unit 2, and the transport decoder 3 in FIG. 1, and the interactive programming unit 100 selects an interactive program from an MPEG transport stream that is transmitted by the broadcasting station.

The start time receiving unit 111 corresponds to the CPU 8 in FIG. 1, and the start time receiving unit 111 receives the start time of the interactive program.

The broadcast time obtaining unit 110 corresponds to the CPU 8 in FIG. 1, and the broadcast time obtaining unit 110 extracts the absolute time information from the TDT of the MPEG transport stream that is transmitted by the broadcasting station, and manages the absolute time information.

The time information management unit 112 corresponds to the CPU 8 in FIG. 1, and the time information management unit 112 records the absolute time information that is obtained by the broadcast time obtaining unit 110 and information of a relative time from the start time of the program that is obtained by the interactive program receiving unit 100 in the second descriptor of the SIT.

The recording program information creation unit 113 corresponds to the CPU 8 in FIG. 1, and the recording program information creation unit 113 creates the SIT as program information for the recording of the interactive program, and records the program start time information that is received by the start time receiving unit 111 on the SIT.

The storage unit 120 corresponds to the DVHS recording/reproduction apparatus 12 in FIG. 1, and the storage unit 120 records the MPEG transport stream that is transmitted by the broadcasting station together with the program start time information that is received by the start time receiving unit 111 and the program absolute time information that is obtained by the broadcast time obtaining unit 110, on a VHS video cassette, as it is in the digital format. At that time, the time information to be recorded is input to the first descriptor of the SIT. Thereby, even when a program requires time information, such as when the programming of the interactive program is included in the MPEG transport stream, such a program can be recorded without a hitch.

The reproduction instruction unit 140 corresponds to a so-called remote control apparatus or the CPU 8 in FIG. 1, and the reproduction instruction unit 140 detects whether the interactive program is recorded in the storage unit 120 and issues the reproduction instruction automatically or in accordance with an instruction by a user.

The reproduction time obtaining unit 130 corresponds to the CPU 8 in FIG. 1, and the reproduction time obtaining unit 130 generates the relative time information on the basis of the absolute time information and the program start time information, both of which, are reproduced from the storage unit 120, and reproduces the interactive program on the basis of the relative time information.

The interactive program reproduction unit 150 corresponds to the CPU 8 in FIG. 1, and the interactive program reproduction unit 150 interprets the programming of the interactive program that is included in the MPEG transport stream which is reproduced from the storage unit 120, in accordance with an instruction of the reproduction instruction unit 140, by an interpreter which is realized by programming of the CPU 8. Thereby, the interactive program reproduction unit 150 can reproduce the so-called interactive program of displaying an image including a question which is previously prepared by the broadcasting station, thereby making a viewer respond to the question by a remote control operation or the like, and the interactive program reproduction unit 150 can transmit the response to the broadcasting station.

In this apparatus shown in FIG. 8, the absolute time information that is included in the MPEG transport stream is recorded on the tape and the absolute time information is changed into the relative time information at the reproduction time. Therefore, the interactive program can be reproduced even at a time having an absolute time which is different from the absolute time in the recording.

In addition, in the apparatus of FIG. 8, the absolute time information is recorded in the first descriptor of the SIT, which can record only the absolute time. However, the absolute time information can be recorded in a second descriptor which can record both the absolute time and the relative time from the beginning of the program.

Further, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself. Here, another recording area on the DVHS cassette tape, the DVC cassette memory, and the DVHS deck memory can record both of the absolute time and the relative time from the beginning of the program.

An apparatus shown in FIG. 9 does not manipulate contents of a service (program) and writes these contents, absolute time information, and start time information of the program on a tape. Then, at the reproduction time, the apparatus obtains relative time information from the absolute time information and the program start time information, both of which are recorded on the tape, and reproduces the contents on the basis of the relative time information.

This apparatus corresponds to the apparatus of FIG. 8. However, while the apparatus of FIG. 8 utilizes the absolute time information that is transmitted by the TDT of the MPEG transport stream, the apparatus of FIG. 9 utilizes relative time information that is transmitted in ordinary transmission formats that are not particularly limited to the MPEG transport stream.

In FIG. 9, numeral 200 denotes an interactive program receiving unit for receiving interactive program broadcasting including video and audio and an interactive program as a part of the broadcasting, and a time when the broadcasting is executed which is indicated by a relative time from a start time of the program. Numeral 211 denotes a start time receiving unit for receiving information of the start time of the interactive program. Numeral 210 denotes a broadcast time obtaining unit for obtaining information of a time when the broadcasting is to be executed, and for managing the time information. Numeral 212 denotes a time information management unit for recording the absolute time information that is obtained by the broadcast time obtaining unit 210 and information of a relative time from the start time of the program which is obtained by the interactive program receiving unit 200. Numeral 213 denotes a recording program information creation unit for creating program information for the recording of the interactive program, and for recording the start time information of the interactive program on the program information. Numeral 220 denotes a storage unit for storing the interactive program that is received by the interactive program receiving unit 200 in a recording area on a recording medium, and for storing the program start time in another area on the recording medium or in a recording apparatus. Numeral 230 denotes a reproduction time obtaining unit for receiving the absolute time information that is stored in the storage unit 220, and for reproducing a flow of time in the recording. Numeral 240 denotes a reproduction instruction unit for detecting whether the interactive program is recorded in the storage unit 220, and for issuing a reproduction instruction automatically or in accordance with an instruction by a user. Numeral 250 denotes an interactive program reproduction unit for receiving the reproduction instruction from the reproduction instruction unit 240 and for receiving the interactive program from the storage unit 220 to thereby execute the interactive program on the basis of the absolute time that is obtained by the reproduction time obtaining unit 230 and the program start time that is obtained from the storage unit 220.

Next, the operation of the apparatus of FIG. 9 will be described. The interactive program receiving unit 200 corresponds to the CS antenna 1, the receiving unit 2, and the transport decoder 3 in FIG. 1, and the interactive program receiving unit 200 selects an interactive program from a data stream that is transmitted by the broadcasting station.

The start time receiving unit 211 corresponds to the CPU 8 in FIG. 1, and the start time receiving unit 211 receives the start time of the interactive program.

The broadcast time obtaining unit 210 corresponds to the CPU 8 in FIG. 1, and the broadcast time obtaining unit 210 extracts the absolute time information from the data stream that is transmitted by the broadcasting station and manages the information.

The time information management unit 212 corresponds to the CPU 8 in FIG. 1, and the time information management unit 212 records the absolute time information that is obtained by the broadcast time obtaining unit 210 and information of the relative time from the start time of the program which is obtained by the interactive program receiving unit 200.

The recording program information creation unit 213 corresponds to the CPU 8 in FIG. 1, and the recording program information creation unit 213 creates program information for the recording of the interactive program and records the start time of the interactive program, which is obtained by the start time receiving unit 211.

The storage unit 220 corresponds to the DVHS recording/reproduction apparatus 12 in FIG. 1, and the storage unit 220 records the data stream that is transmitted by the broadcasting station together with the program start time information received by the start time receiving unit 211 and the program absolute time information obtained by the broadcast time obtaining unit 210 on a VHS video cassette, as it is in the digital format. At that time, the time information to be recorded is input to a first area in a recording format of the VHS video cassette. Thereby, even when a program requires time information, such as when the programming of the interactive program is included in the data stream, such a program can be recorded without a hitch.

The reproduction instruction unit 240 corresponds to a so-called remote control apparatus or the CPU 8 in FIG. 1, and the reproduction instruction unit 240 detects whether the interactive program is recorded in the storage unit 220 and issues the reproduction instruction automatically or in accordance with an instruction by a user.

The reproduction time obtaining unit 230 corresponds to the CPU 8 in FIG. 1, and the reproduction time obtaining unit 230 generates the relative time information on the basis of the absolute time information and the program start time information, both of which are reproduced from the storage unit 220, and reproduces the interactive program on the basis of the relative time information.

The interactive program reproduction unit 250 corresponds to the CPU 8 in FIG. 1, and the interactive program reproduction unit 250 interprets the programming of the interactive program included that is in the data stream which is reproduced from the storage unit 220, in accordance with an instruction of the reproduction instruction unit 240, by an interpreter which is realized by programming of the CPU 8. Thereby, the interactive program reproduction unit 250 can reproduce the so-called interactive program of displaying an image including a question which is previously prepared by the broadcasting station, thereby making a viewer respond to the question by a remote control operation or the like, and the interactive program reporduction unit 250 can then transmit the response to the broadcasting station.

In this apparatus shown in FIG. 9, the absolute time information that is included in the data stream from the broadcasting station is recorded on the tape and the absolute time information is changed into the relative time information at the reproduction time. Therefore, the interactive program can be reproduced even at a time having an absolute time which is different from the absolute time in the recording.

In addition, in the apparatus of FIG. 9, the absolute time information is recorded in the first area of the VHS video cassette, which can record only the absolute time. However, the absolute time information can be recorded in a second area which can record both the absolute time and the relative time from starting of the program.

Further, information is recorded in another recording area on the tape of a DVHS cassette or the like. However, the information can be recorded in a recording apparatus such as a memory other than the tape of a DVC or the like, or in a memory of a recording/reproduction apparatus such as a DVHS deck itself. Here, another recording area on the DVHS cassette tape, the DVC cassette memory, and the DVHS deck memory can record both the absolute time and the relative time from the beginning of the program.

An apparatus shown in FIG. 10 does not manipulate contents of a service (program) and writes these contents and start time information of the program on a tape. Then, at the reproduction time, the apparatus obtains relative time information recorded on the tape, and reproduces the contents on the basis of the relative time information.

In FIG. 10, numeral 100 denotes an interactive program receiving unit for receiving interactive program broadcasting including video and audio and an interactive program as a part of the broadcasting, and a relative time when the broadcasting is designated to be executed. Numeral 110 denotes a broadcast time obtaining unit for obtaining information of an absolute time when the broadcasting is to be performed, and for managing the absolute time information. Numeral 111 denotes a start time receiving unit for receiving information of a start time of the interactive program. Numeral 115 denotes a relative time generation unit for generating a relative time from the beginning of the interactive program on the basis of the start time of the interactive program and the absolute time information that is obtained by the broadcast time obtaining unit 110. Numeral 112 denotes a time information management unit for recording the relative time information that is generated by the relative time generation unit 115 in a second descriptor of a SIT. Numeral 113 denotes a recording program information creation unit for creating a SIT as program information for the recording of the interactive program. Numeral 120 denotes a storage unit for storing the interactive program, which is changed by the time information changing unit 105, in an area on a recording medium, and for storing the relative time that is obtained from the second descriptor of the SIT in another area on the recording medium or in a recording apparatus. Numeral 130 denotes a reproduction time obtaining unit for receiving the relative time information that is stored in the storage unit 120, and for reproducing a flow of time in the recording. Numeral 140 denotes a reproduction instruction unit for detecting whether the interactive program is recorded in the storage unit 120, and for issuing a reproduction instruction automatically or in accordance with an instruction by a user. Numeral. 150 denotes an interactive program reproduction unit for receiving the reproduction instruction from the reproduction unit 140 and for receiving the interactive program from the storage unit 120 to thereby execute the interactive program on the basis of the relative time that is obtained by the reproduction time obtaining unit 130.

Next, the operation if the apparatus of FIG. 10 will be described. The interactive program receiving unit 100 corresponds to the CS antenna 1, the receiving unit 2, and the transport decoder 3 in FIG. 1, and the interactive program receiving unit 100 selects an interactive program from an MPEG transport stream that is transmitted by the broadcasting station.

The broadcast time obtaining unit 110 corresponds to the CPU 8 in FIG. 1, and the broadcast time obtaining unit 110 extracts time information from the TDT of the MPEG transport stream that is transmitted by the broadcasting station, and manages the time information.

The start time receiving unit 111 corresponds to the CPU 8 in FIG. 1, and the start time receiving unit 111 receives the start time of the interactive program.

The relative time generation unit 115 corresponds to the composition unit 11 in FIG. 1, and the relative time generation unit 115 generates a relative time from the beginning of the interactive program, on the basis of the start time of the interactive program, that is obtained by the start time receiving unit 111 and the absolute time information that is obtained by the broadcast time obtaining unit 110.

The time information management unit 112 corresponds to the CPU in FIG. 8, and the time information management unit 112 records the relative time information that is generated by the relative time generation unit 115 in the second descriptor of the SIT.

The recording program information creation unit 113 corresponds to the CPU 8 in FIG. 1, and the recording information creation unit 113 creates the SIT as program information for the recording of the interactive program.

The storage unit 120 corresponds to the DVHS recording/reproduction apparatus 12 in FIG. 1, and the storage unit 120 records the MPEG transport stream that is transmitted by the broadcasting station together with the relative time information generated by the relative time generation unit 115 on a VHS video cassette, as it is in the digital format. At that time, the relative time information is input to the SIT. Thereby, even when a program requires time information, such as when the programming of the interactive program is included in the MPEG transport stream, such a program can be recorded without a hitch.

The reproduction instruction unit 140 corresponds to a so-called remote control apparatus or the CPU 8 in FIG. 1, and the reproduction instruction unit 140 detects whether the interactive program is recorded in the storage unit 120 and issues the reproduction instruction automatically or in accordance with an instruction by a user.

The reproduction time obtaining unit 130 corresponds to the CPU 8 in FIG. 1, and the reproduction time obtaining unit 130 reproduces the relative time information that is reproduced from the storage unit 120.

The interactive program reproduction unit 150 corresponds to the CPU 8 in FIG. 1, and the interactive program reproduction unit 150 interprets the programming of the interactive program that is included in the MPEG transport stream which is reproduced from the storage unit 120, in accordance with an instruction of the reproduction instruction unit 140, by an interpreter which is realized by programming of the CPU 8. Thereby, the interactive program reproduction unit 150 can reproduce the so-called interactive program of moving a simple moving image with a still picture for the background or displaying an image including a question which is previously prepared by the broadcasting station, thereby making a viewer respond to the question by a remote control operation or the like, and the interactive program reproduction unit 150 can then transmit the response to the broadcasting station.

In this apparatus shown in FIG. 10, the relative time information as the elapsed time of the program is recorded on the tape together with the MPEG transport stream, and the program is reproduced at the reproduction time on the basis of the relative time information. Therefore, the interactive program can be reproduced even at a time having an absolute time which is different from the absolute time in the recording.

In addition, in the apparatus of FIG. 10, the SIT is recorded in another area on the tape of a DVHS cassette or the like. However, the SIT can be recorded in a recording apparatus such as a memory other than the tape of a DVC or the like, or in a memory of a recording/reproduction apparatus such as a DVHS deck itself.

Figure 11:
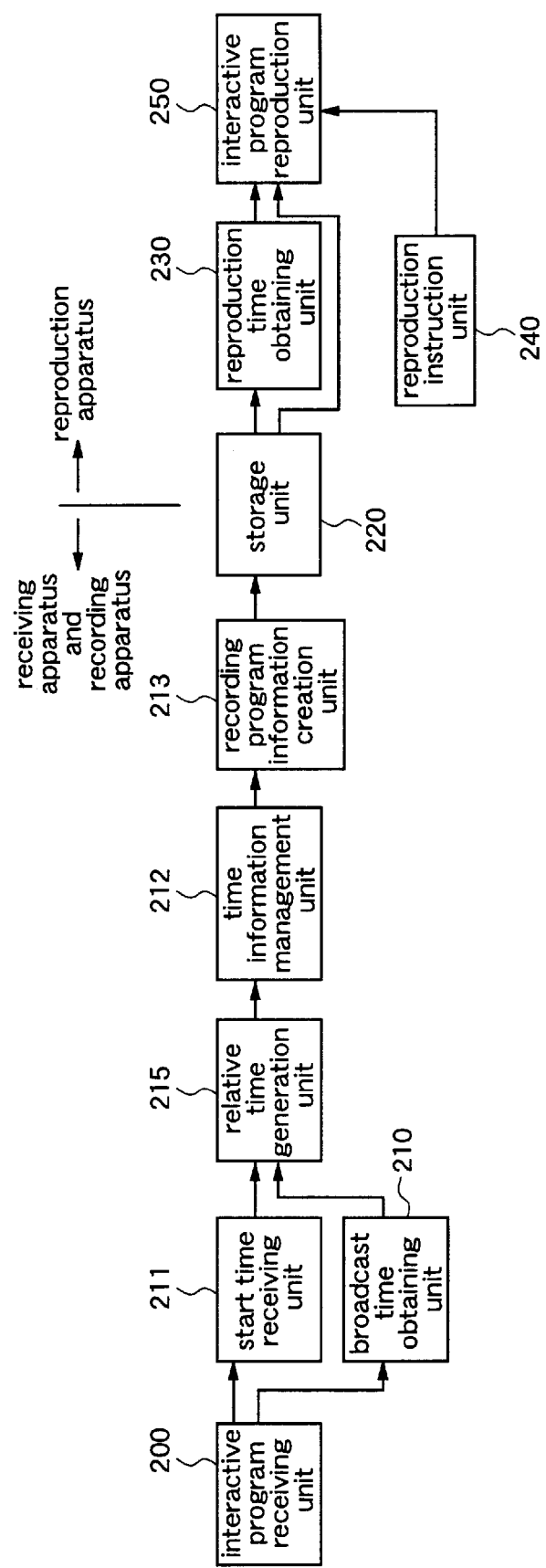
FIG. 11 is a block diagram representing a variation of the receiving apparatus, the recording apparatus, and the reproduction apparatus of FIG. 1.
Figure 12:
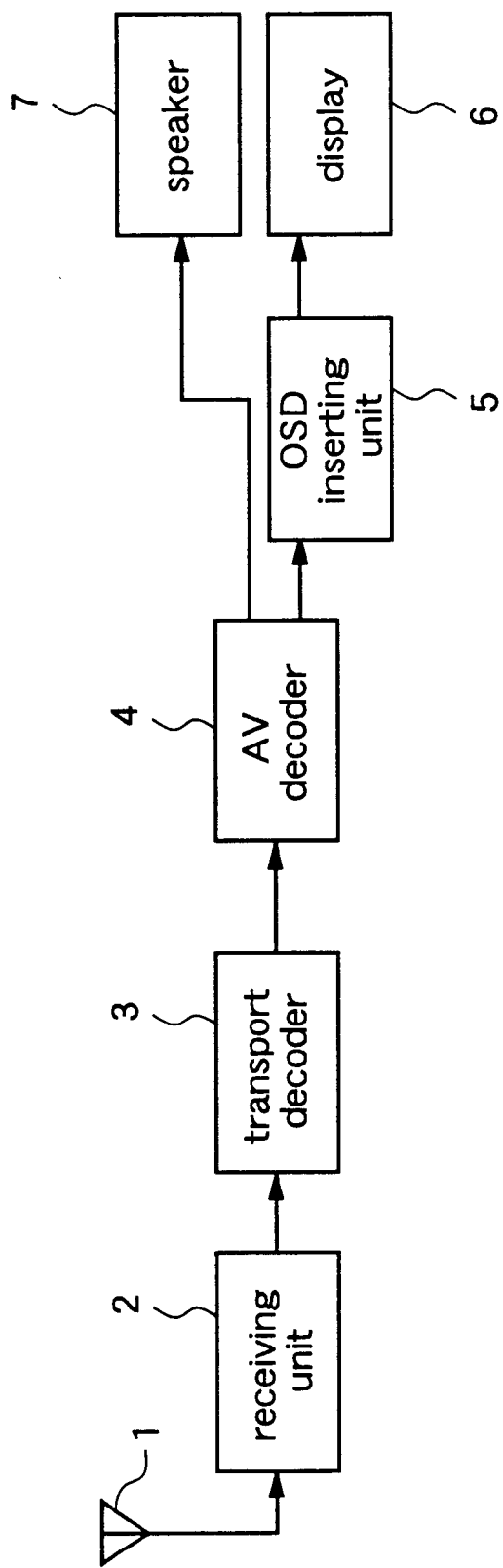
FIG. 12 is a block diagram illustrating a structure of a conventional CS broadcasting receiver.

An apparatus shown in FIG. 11 does not manipulate contents of a service (program) and writes these contents and start time information of the program on a tape. Then, at the reproduction time, the apparatus obtains relative time information that is recorded on the tape and reproduces the contents on the basis of the relative time information.

This apparatus corresponds to the apparatus of FIG. 10. However, while the apparatus of FIG. 10 utilizes the absolute time information transmitted by the MPEG transport stream, the apparatus of FIG. 11 utilizes relative time information transmitted in ordinary transmission formats that are not particularly limited to the MPEG transport stream.

In FIG. 11., numeral 200 denotes an interactive program receiving unit for receiving interactive program broadcasting including video and audio and an interactive program as a part of the broadcasting, and a relative time when the broadcasting is designated to be executed. Numeral 210 denotes a broadcast time obtaining unit for obtaining information of an absolute time when the broadcasting is to be performed, and for managing the absolute time information. Numeral 211 denotes a start time receiving unit for receiving information of a start time of the interactive program. Numeral 215 denotes a relative time generation unit for generating a relative time from the beginning of the interactive program, on the basis of the start time of the interactive program and the absolute time information that is obtained by the broadcast time obtaining unit 210. Numeral 212 denotes a time information management unit for performing management in the recording of the relative time information that is generated by the relative time generation unit 215. Numeral 213 denotes a recording program information creation unit for creating program information for the recording of the interactive program. Numeral 220 denotes a storage unit for storing the interactive program that is changed by the time information changing unit 205 in an area on a recording medium, and for storing the relative time in another area on the recording medium or in a recording apparatus. Numeral 230 denotes a reproduction time obtaining unit for receiving the relative time information that is stored in the storage unit 220, and for reproducing a flow of time in the recording. Numeral 240 denotes a reproduction instruction unit for detecting whether the interactive program is recorded in the storage unit 220, and for issuing a reproduction instruction automatically or in accordance with an instruction by a user. Numeral 250 denotes an interactive program reproduction unit for receiving the reproduction instruction from the reproduction instruction unit 204 and for receiving the interactive program from the storage unit 220 to thereby execute the interactive program on the basis of the relative time that is obtained by the reproduction time obtaining unit 230.

Next, the operation of the apparatus of FIG. 11 will be described. The interactive program receiving unit 200 corresponds to the CS antenna 1, the receiving unit 2, and the transport decoder 3 in FIG. 1, and the interactive program receiving unit 200 selects an interactive program from a data stream that is transmitted by the broadcasting station.

The broadcast time obtaining unit 210 corresponds to the CPU 8 in FIG. 1, and the broadcast time obtaining unit 210 extracts time information from the data stream that is transmitted by the broadcasting station, and manages the time information.

The start time receiving unit 211 corresponds to the CPU 8 in FIG. 1, and the start time receiving unit 211 receives the start time of the interactive program.

The relative time generation unit 215 corresponds to the composition unit 11 in FIG. 1, and the relative time generation unit 215 generates a relative time from the beginning of the interactive program, on the basis of the start time of the interactive program, that is obtained by the start time receiving unit 211 and the absolute time information that is obtained by the broadcast time obtaining unit 210.

The time information management unit 212 corresponds to the CPU 8 in FIG. 1, and the time information management unit 212 performs management in the recording of the relative time information that is generated by the relative time generation unit 215.

The recording program information creation unit 213 corresponds to the CPU 8 in FIG. 1, and the recording program information creation unit 213 creates program information for the recording of the interactive program.

The storage unit 220 corresponds to the DVHS recording/reproduction apparatus 12 in FIG. 1, and the storage unit 220 records the data stream that is transmitted by the broadcasting station together with the relative time information that is generated by the relative time generation unit 215 on a VHS video cassette as it is in the digital format. At that time, the relative time information is input to a predetermined storage area in a format of the VHS video cassette. Thereby, even when a program requires time information, such as when the programming of the interactive program is included in the data stream, such a program can be recorded without a hitch.

The reproduction instruction unit 240 corresponds to a so-called remote control apparatus or the CPU 8 in FIG. 1, and the reproduction instruction unit 240 detects whether the interactive program is recorded in the storage unit 220 and issues the reproduction instruction automatically or in accordance with an instruction by a user.

The reproduction time obtaining unit 230 corresponds to the CPU 8 in FIG. 1, and the reproduction time obtaining unit 230 reproduces the relative time information that is reproduced from the storage unit 220.

The interactive program reproduction unit 250 corresponds to the CPU 8 in FIG. 1, and the interactive program reproduction unit 250 interprets the programming of the interactive program that is included in the data stream which is reproduced from the storage unit 220, in accordance with an instruction of the reproduction instruction unit 240, by an interpreter which is realized by programming of the CPU 8. Thereby, the interactive program reproduction unti 250 can reproduce the so-called interactive program of moving a simple moving picture with a still picture for the background or displaying an image including a question which is previously prepared by the broadcasting station, thereby making a viewer respond to the question by a remote control operation or the like, and the interactive program reproduction unit 250 can transmit the response to the broadcasting station.

In this apparatus shown in FIG. 11, the relative time information, as the elapsed time of the program, is recorded on the tape together with the data stream, and the program is reproduced at the reproduction time on the basis of the relative time information. Therefore, the interactive program can be reproduced even at a time having an absolute time which is different from the absolute time in the recording.

In addition, in the apparatus of FIG. 11, the SIT is recorded in another recording area on the tape of a DVHS cassette or the like. However, the SIT can be recorded in a recording apparatus such as a memory other than the tape of a DVC or the like, or in a memory of a recording/reproduction apparatus such as a DVHS deck itself.

Here, in the apparatuses of FIGS. 2 to 11, the time information that is transmitted together with the transport stream or the data stream including the interactive program can be relative time information. According to this format, the interactive program can be reproduced without the time information being manipulated.

Second Embodiment

While the first embodiment relates to a case where the normal reproduction is performed in the DVHS, the second embodiment of the present invention relates to an apparatus which takes measures against a problem where a screen temporarily goes black during reproduction of an interactive program.

The DVHS also has the trick playback function in addition to the normal playback function, like normal VHS recording/reproduction apparatuses. The trick playback function includes a so-called queue/review (fast forward playback/fast rewind playback) operation and a still playback operation. In addition to this, there is also a fast forward/fast rewind operation of running a tape at a high speed without reproducing images. Among these, in a case where a tape having a program recorded thereon is fast-forwarded and then the fast forward operation is canceled near a target scene so as to perform the normal reproduction, a screen temporarily goes black when an interactive program is recorded on the tape, unlike the usual MPEG program.

This corresponds to a case where, when an interactive program such as television shopping is reproduced, the tape is fast-forwarded to skip scenes until the introduction of a target item is started to thereby reduce a viewing time, and then the reproduction is switched into the normal reproduction. In this case, since the interactive program is executed by programming, a screen after the normal reproduction is resumed may not appear immediately.

These situations will be described with reference to FIG. 21. As shown in FIG. 21(a), when programs are recorded, information corresponding to programs of a channel A is successively recorded with the lapse of time. In this case, as shown in FIG. 21(b), a program 1 of the channel A is replaced halfway with a program 2, and, as shown in FIG. 21(c), the programs are recorded on the tape in this order.

When the tape on which the programs are continuously recorded is reproduced, there is no problem even if a part of the tape is fast-forwarded and skipped as shown in FIG. 21(d).

However, in a case where recording of a program is interrupted halfway and recording is resumed from the beginning of the next program, as shown in FIGS. 21(e) and 21(f), a DIT is added at a part corresponding to the head of the next program. As shown in FIG. 21(g), this DIT is found when the recorded tape is successively reproduced normally. Therefore, it is easily known that there was an interruption during the recording.

However, when the fast forward is performed in a section including the DIT which is added at the part corresponding to the head of the next program, as shown in FIG. 21(h), the reproduction of the information recorded on the tape is not performed in this section, whereby the DIT cannot be detected.

Accordingly, unlike the usual MPEG program, a scene is erased in the interactive program.

In the interactive program, an interpreter interprets programming that is transmitted by the broadcasting station and processes data that is transmitted together with the programming, to thereby display or erase an image on a screen. However, in the above-described case, at a timing when the fast forward of the tape is finished, the part where the DIT is added is already passed through, whereby the DIT cannot be detected.

When the DIT cannot be detected, the interruption in the recording of the program is not found. Therefore, while an interactive program which is completely different from the initial interactive program should be reproduced, the initial program is reproduced as it is. To avoid such a situation, the display of the interactive program should be temporarily turned off.

Figure 22:
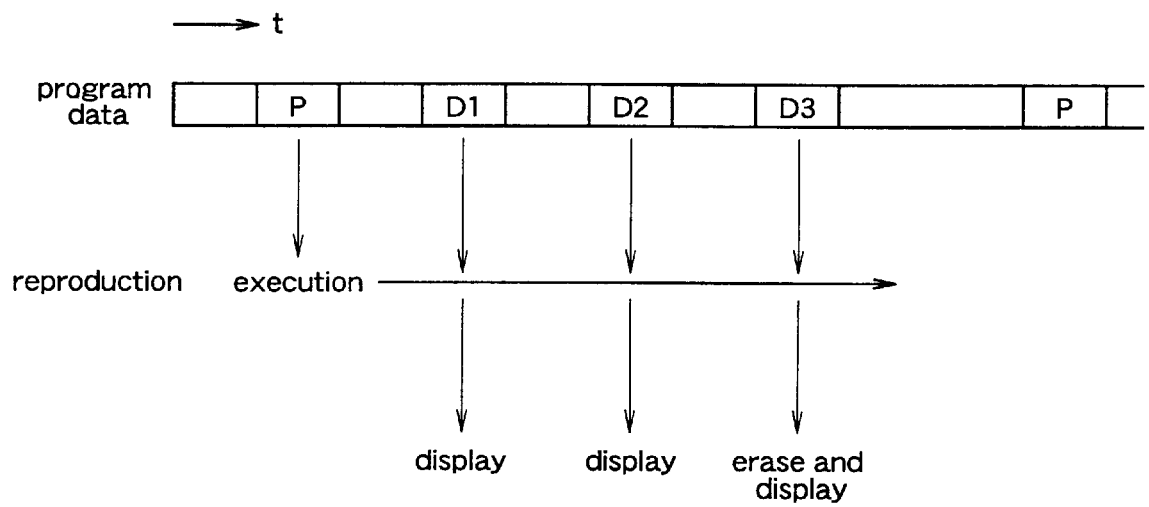
FIG. 22 is a diagram illustrating a format of an interactive program.

FIG. 22 illustrates programming data of an interactive program comprising programmings P for executing a screen display operation, and data D1, D2, D3, . . . which are displayed on the screen by the programming P. An interpreter which is realized by the CPU of the DVHS recording/reproduction apparatus interprets the programmings P and the data D1, D2, D3, . . . , so as to display the interactive program on the screen. Generally, one program includes a plurality of programmings P and data D1, D2, D3, . . . , which have different contents. Therefore, when a different interactive program is to be reproduced, the same programming cannot always be utilized. Accordingly in that case, the programming is reloaded to the interpreter again as a precaution, to thereby display a different screen. During this time, the screen temporarily goes black.

Figure 23:
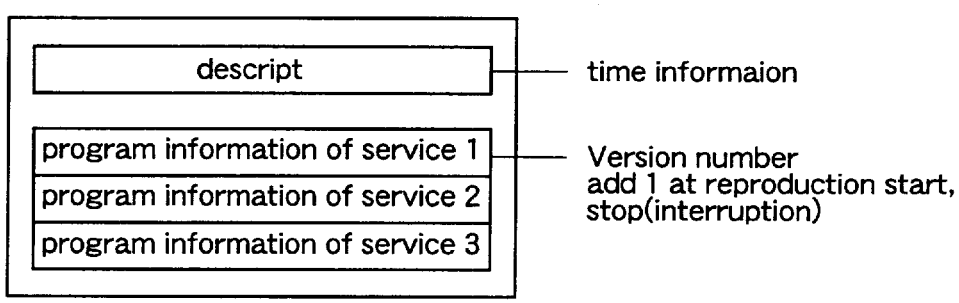
FIG. 23 is a diagram illustrating at structure of a SIT in the receiving apparatus, the recording apparatus, and the reproduction apparatus of the second embodiment.

In this second embodiment, as shown in FIG. 23, time information TI is described in a descriptor in a SIT and program information of a service 1, . . . , and program information of a service n, as well as a version number VN of the programming is described in the program information of the service 1, . . . , the program information of the service n.

This version number VN does not indicate the number of times the software is itself revised, unlike the so-called version number of software. The version number VN simply indicates a running state of a tape, and the version number is updated by adding one (+1) or the like at the start, stop, interruption or the like of the reproduction. Since this version number VN is described in the SIT, the version number VN can be surely detected even in the case of the fast forward.

Figure 24:
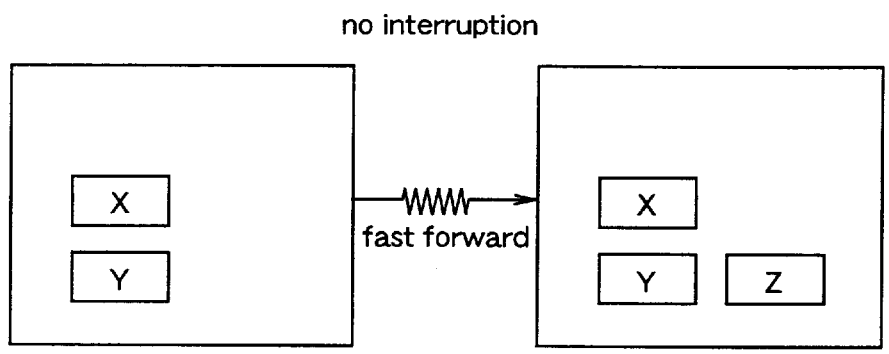
FIG. 24 is a diagram showing effects which are obtained when the fast forward operation and the normal reproduction is performed in the receiving apparatus, the recording apparatus, and the reproduction apparatus of the second embodiment.

Then, when the version number is not changed as a result of the fast forward, a programming corresponding to this version number is utilized. In this case, when data after the fast forward is performed to skip data is used, the screen reproduction can be performed without the programming being loaded again. Therefore, even when the fast-forward operation is performed, the interactive program can be reproduced as shown in FIG. 24, without the screen temporarily going black.

FIG. 20 is a diagram illustrating a structure of means for updating the time information and the version number of the second embodiment. In FIG. 20, numeral 116 denotes a tape running state change detection unit for detecting a change in a running state of a tape.

Numeral 118 denotes time information and version number updating means. This time information and version updating means updates the time information TI when the tape running state change detection unit 116 detects a change in the running state of the tape, and updates the version number at each change in the running state of the tape.

Numeral 117 denotes a recording program information creation unit, and the recording program information creation unit 117 creates a SIT similar to numeral 113 in FIGS. 2, 4, 6, 8, and 10.

Next, an operation of the means for updating the time information and the version number of FIG. 20 will be described. The tape running state change detection unit 116 detects a change in the running state of the tape, such as a start, stop, or interruption of reproduction. The tape running state change detection unit 116 can detect a change in a decoded signal that is obtained by decoding a signal received by a remote control receiver (not shown), or the tape running state change detection unit 116 can detect a change in an actual running state of a tape.

When the change in the running state of the tape is detected as described above, the time information and version number updating means 118 updates the time information TI in the descriptor in the SIT, and updates the version number in the program information of the service n at each change in the running state of the tape by adding 1 or the like to the version number.

Here, the recording program information creation unit 117 creates the SIT, and the time information and version number updating means 118 updates the time information TI in the descriptor in the SIT, which is previously created by this recording program information creation unit 117, and the version number in the program information in the service n at each change in the running state of the tape.

Accordingly, even when a reproduction signal from the tape cannot be received due to the fast forward and the DIT cannot be referred to, the version number in the program information in the SIT is referred, to and when the version number is not updated, it immediately becomes clear that the state change such as the interruption or stop of the tape did not occur. Therefore, there is no necessity of reloading the same programming again, whereby the screen is prevented from going black due to a reloading of the programming.

Here, the time information TI is described not only in the descriptor but also in the program information. Therefore, by utilizing this, when the time information TI after the fast forward and the time information TI before the fast forward is close, the same programming can be utilized. Therefore, also in this case, even when the fast forward is performed, the interactive program can be reproduced without the screen temporarily going Black.

In this second embodiment, the DVHS recording/reproduction apparatus is utilized as a means for recording/reproducing the MPEG transport stream as it is in the digital format. However, another digital information recording/reproducing means such as a DVD or DVC can be utilized. In this case, the same effects as those in the second embodiment can be obtained. Further, in this embodiment, the version number is recorded/reproduced on/from the tape together with the MPEG transport stream. However in a DVC cassette or the like, it can be stored in an IC memory which is contained in a cassette separately from a tape.

As described above, according to the receiving apparatus, the recording apparatus, and the reproduction apparatus of the present invention, time information that is included in a data stream can be recorded on a tape and reproduced. Therefore, the present invention is extremely useful as an apparatus for recording and reproducing an interactive program and is particularly suitable for realizing the recording and reproduction of the interactive program for the DVHS or the like.

What is claimed is:

1. A system comprising:
a receiving apparatus for receiving an interactive program;
a recording apparatus for recording the interactive program received by said receiving apparatus; and
a reproduction apparatus for reproducing the interactive program recorded in said reproduction apparatus, wherein:
said receiving apparatus comprises
an interactive program receiving unit for receiving interactive program broadcasting which includes the interactive program, a TDT having an absolute time of the interactive program when the broadcasting is executed, at least one of video and audio, and interactive programming, which are each indicated as a part of the broadcasting, and
a broadcast time obtaining unit for obtaining absolute time information corresponding to the absolute time when the broadcasting is performed, and for managing the absolute time information;
said recording apparatus comprises
a recording program information creation unit for creating a SIT as program information for recording of the interactive program,
a time information management unit for recording, from the TDT, the absolute time information obtained by said broadcast time obtaining unit in either a first descriptor or a second descriptor of the SIT, and
a storage unit for storing the interactive program received by said interactive program receiving unit in a recording area on a recording medium and for storing the absolute time information obtained from the first descriptor or the second descriptor in another area on the recording medium or in a recording device;
said reproduction apparatus comprises
a reproduction time obtaining unit for receiving the absolute time information stored in said storage unit, and for reproducing a flow of time at a recording time,
a reproduction instruction unit for detecting when the interactive program is recorded in said storage unit, and for issuing a reproduction instruction automatically or in accordance with a user instruction, and
an interactive program execution unit for receiving the reproduction instruction from said reproduction instruction unit and the interactive program from said storage unit so as to execute and reproduce the interactive program recorded in said storage unit on the basis of the absolute time information obtained by said reproduction time obtaining unit.

2. A system comprising:
a receiving apparatus for receiving an interactive program;
a recording apparatus for recording the interactive program received by said receiving apparatus; and
a reproduction apparatus for reproducing the interactive program recorded in said reproduction apparatus, wherein:
said receiving apparatus comprises
an interactive program receiving unit for receiving interactive program broadcasting which includes the interactive program, a TDT having an absolute time of the interactive program when the broadcasting is executed, at least one of video and audio, and interactive programming, which are each indicated as a part of the broadcasting, and
a broadcast time obtaining unit for obtaining absolute time information corresponding to the absolute time when the broadcasting is performed, and for managing the absolute time information;
said recording apparatus comprises
a recording program information creation unit for creating a SIT as program information for recording of the interactive program,
a time information management unit for recording, from the TDT, the absolute time information obtained by said broadcast time obtaining unit in either a first descriptor or a second descriptor of the SIT, and
a storage unit for storing the interactive program received by said interactive program receiving unit in a recording area on a recording medium, and for storing the absolute time information obtained from the first descriptor or the second descriptor in another area on the recording medium or in a recording device;
said reproduction apparatus comprises
a reproduction time obtaining unit for obtaining the absolute time information stored in said storage unit,
a relative time generation unit for generating relative time information on the basis of the absolute time information obtained by said reproduction time obtaining unit,
a reproduction instruction unit for detecting when the interactive program is recorded in said storage unit, and for issuing a reproduction instruction automatically or in accordance with an a user instruction, and
an interactive program execution unit for receiving the reproduction instruction from said reproduction instruction unit and the interactive program from said storage unit so as to execute and reproduce the interactive program stored in said storage unit on the basis of the relative time information obtained by said relative time generation unit.

3. A system comprising:
a receiving apparatus for receiving an interactive program;
a recording apparatus for recording the interactive program received by said receiving apparatus; and
a reproduction apparatus for reproducing the interactive program recorded in the recording apparatus, wherein:
said recording apparatus comprises
an interactive program receiving unit for receiving interactive program broadcasting which includes the interactive program, an absolute time of the interactive program when the broadcasting is executed, at least one of video and audio, and interactive programming, which are each indicated as a part of the broadcasting, and a broadcast time obtaining unit for obtaining absolute time information corresponding to the absolute time when the broadcasting is performed;

said recording apparatus comprises a recording program information creation unit for creating program information for recording of the interactive program, a time information management unit for performing management when the absolute time information obtained by said broadcast time obtaining unit is recorded on a recording medium, and a storage unit for storing the interactive program received by said interactive program receiving unit in a recording area on the recording medium, and for storing the absolute time information in another area on the recording medium or in a recording device;

said reproduction apparatus comprises a reproduction time obtaining unit for receiving the absolute time information stored in said storage unit, and for reproducing a flow of time at a recording time, a reproduction instruction unit for detecting when the interactive program is recorded in said storage unit, and for issuing a reproduction instruction automatically or in accordance with a user instruction, and an interactive program execution unit for receiving the reproduction instruction from said reproduction instruction unit and the interactive program from said storage unit so as to execute and reproduce the interactive program stored in said storage unit on the basis of the absolute time information obtained by said reproduction time obtaining unit.

4. A system comprising:

a receiving apparatus for receiving an interactive program;

a recording apparatus for recording the interactive program received by said receiving apparatus; and a reproduction apparatus for reproducing the interactive program recorded in the recording apparatus, wherein:

said recording apparatus comprises an interactive program receiving unit for receiving interactive program broadcasting which includes the interactive programs, an absolute time of the interactive program when the broadcasting is executed, at least one of video and audio, and interactive programming, which are each indicated as a part of the broadcasting, and a broadcast time obtaining unit for obtaining absolute time information corresponding to the absolute time when the broadcasting is performed;

said recording apparatus comprises a recording program information creation unit for creating program information for recording of the interactive program, a time information management unit for performing management when the absolute time information obtained by said broadcast time obtaining unit is recorded on a recording medium, and a storage unit for storing the interactive program received by said interactive program receiving unit in a recording area on the recording medium, and for storing the absolute time information in another area on the recording medium or in a recording device;

said reproduction apparatus comprises a production time obtaining unit for obtaining the absolute time information stored in said storage unit, a relative time generation unit for generating relative time information on the basis of the absolute time information obtained by said reproduction time obtaining unit, a reproduction instruction unit for detecting when the interactive program is recorded in said storage unit, and for issuing a reproduction instruction automatically or in accordance with a user instruction and an interactive program execution unit for receiving the reproduction instruction from said reproduction instruction unit and the interactive program from said storage unit so as to execute and reproduce the interactive program stored in said storage unit on the basis of the relative time information obtained by said relative time generation unit.

5. A receiving apparatus comprising:

an interactive program receiving unit for receiving interactive program broadcasting which includes an interactive program, a TDT having an absolute time of the interactive program when the broadcasting is executed, video and audio, and interactive programming, which are each designated as a part of the broadcasting;

a time information changing unit for changing an absolute time information corresponding to the absolute time of the interactive program received by said interactive program receiving unit into information of a relative time from a start time of the interactive program;

a broadcast time obtaining unit for obtaining the the absolute time information when the broadcasting is performed, and for managing the absolute time information; and a relative time generation unit for generating information of a relative time from starting of the interactive program on the basis of the start time of the interactive program and the absolute time information obtained by said broadcast time obtaining unit.

6. A recording apparaus for recording the interactive program received by the receiving apparatus of claim 5, said recording apparatus comprising:

a recording program information creation unit for creating a SIT as program information for recording of interactive program;

a time information management unit for recording, from the absolute time information obtained by said broadcast time obtaining unit, the relative time information in a descriptor of the SIT; and a storage unit for storing the interactive program whose time information is changed by said time information changing unit in an area on a recording medium, and for storing the relative time information obtained from the descriptor of the SIT in another area on the recording medium or in a recording device.

7. The recording apparatus of claim 6, wherein said time information management unit records the absolute time information in the descriptor, in addition to the relative time information, or another descriptor of the SIT.

8. A reproduction apparatus for reproducing the interactive program recorded in the recording apparatus of claim 6 or 7, said reproduction apparatus comprising:

a reproduction time obtaining unit for receiving the relative time information stored in said storage unit, and for reproducing a flow of time at a recording time;

a reproduction instruction unit for detecting when the interactive program is recorded in said storage unit, and for issuing a reproduction instruction automatically or in accordance with a user instruction; and an interactive program reproduction unit for receiving the reproduction instruction from said reproduction instruction unit and the interactive program from said storage unit so as to execute and reproduce the interactive program stored in said storage unit on the basis of the relative time information obtained by said reproduction time obtaining unit.

9. A receiving apparatus comprising:

an interactive program receiving unit for receiving interactive program broadcasting which includes an interactive program, an absolute time of the interactive program when the broadcasting is executed, video and audio, and interactive programming, which are each designated as a part of the broadcasting;

a time information changing unit for changing absolute time information corresponding to the absolute time of the interactive program received by said interactive program receiving unit into information corresponding to a relative time from a start time of the interactive program;

a broadcast time obtaining unit for obtaining the absolute time information when the broadcasting is performed, and for managing the absolute time information; and a relative time generation unit for generating relative time information from starting of the interactive program on the basis of the start time of the interactive program and the absolute time information obtained by said broadcast time obtaining unit.

10. A recording apparatus for recording the interactive program received by the receiving apparatus of claim 9, said recording apparatus comprising:

a recording program information creation unit for creating program information for recording of the interactive program;

a time information management unit for performing management when the relative time information which is recorded from the absolute time information obtained by said broadcast time obtaining unit is recorded on a recording medium; and a storage unit for storing the interactive program whose time information is changed by said time information changing unit in an area on the recording medium, and for storing the relative time information in another area on the recording medium or in a recording device.

11. The recording apparatus of claim 10, wherein said time information management unit records the absolute time information in addition to the relative time information.

12. A reproduction apparatus for reproducing the interactive program recorded in the recording apparatus of claim 10 or 11, said reproduction apparatus comprising:

a reproduction time obtaining unit for receiving the relative time information stored in said storage unit, and for reproducing a flow of time at a recording time;

a reproduction instruction unit for detecting when the interactive program is recorded in said storage unit, and for issuing a reproduction instruction automatically or in accordance with a user instruction; and an interactive program reproduction unit for receiving the reproduction instruction from said reproduction instruction unit and the interactive program from said storage unit so as to execute and reproduce the interactive program stored in said storage unit on the basis of the relative time information obtained by said reproduction time obtaining unit.

13. A receiving unit comprising:

an interactive program receiving unit for receiving interactive program broadcasting including an interactive program in which a time when the broadcasting of the interactive program is executed is indicated by a relative time from a start time of the interactive program, and including video, audio and interactive programming as a part of the broadcasting, and a TDT having an absolute time of the interactive program;

a start time receiving unit for receiving start time information corresponding to the start time of the interactive program; and a broadcast time obtaining unit for obtaining absolute time information corresponding to the absolute time when the broadcasting is performed, and for managing the absolute time information.

14. A recording apparatus for recording the interactive program received by the receiving apparatus of claim 13, said recording apparatus comprising:

a recording program information creation unit for creating a SIT as program information for recording of the interactive program;

a time information management unit for recording the absolute time information obtained by said broadcast time obtaining unit and relative time information from the start time of the interactive program obtained by said interactive program receiving unit in a descriptor of the SIT; and a storage unit for storing the interactive program received by said interactive program receiving unit in a recording area on a recording medium, and for storing the absolute time information and the relative time information, which is obtained from the descriptor of the SIT, in another area on the recording medium or in a recording device.

15. The recording apparatus of claim 14, wherein said time information management unit records the absolute time information in another descriptor of the SIT.

16. A reproduction apparatus for reproducing the interactive program recorded in the recording apparatus of claim 14 or 15, said reproduction apparatus comprising:

a reproduction time obtaining unit for receiving the absolute time information stored in said storage unit, and for reproducing a flow of time at a recording time;

a reproduction instruction unit for detecting when the interactive program is recorded in said storage unit, and for issuing a reproduction instruction automatically or in accordance with a user instruction; and an interactive program reproduction unit for receiving the reproduction instruction from said reproduction instruction unit and the interactive program from said storage unit so as to generate relative time information on the basis of the absolute time information obtained by the reproduction time obtaining unit and the program start time information obtained from said storage unit to thereby execute and reproduce the interactive program stored in said storage unit.

17. A receiving apparatus comprising:

an interactive program receiving unit for receiving interactive program broadcasting including an interactive program in which a time when the broadcasting is executed is indicated by a relative time from a start time of the interactive program, and including video, audio and interactive programming, as a part of the broadcasting, and an absolute time of the interactive program;

a start time receiving unit for receiving start time information corresponding to the start time of the interactive program; and a broadcast time obtaining unit for obtaining absolute time information corresponding to the absolute time when the broadcasting is performed, and for managing the absolute time information.

18. A recording apparatus for recording the interactive program received by the receiving apparatus of claim 17, said recording apparatus comprising:

a recording program information creation unit for creating program information for recording of the interactive program;

a time information management unit for recording the absolute time information obtained by said broadcast time obtaining unit and relative time information corresponding to the relative time from the start time of the interactive program obtained by said interactive program receiving unit; and a storage unit for storing the interactive program received by said interactive program receiving unit in a recording area on a recording medium, and for storing the absolute time information and the relative time information in another area on the recording medium or in a recording apparatus device.

19. A recording apparatus for reproducing the interactive program recorded in the recording apparatus of claim 18, said recording apparatus comprising:

a reproduction time obtaining unit for receiving the absolute time information stored in the said storage unit, and for reproducing a flow of time at a recording time;

a reproduction instruction unit for detecting when the interactive program is recorded in said storage unit, and for issuing a reproduction instruction automatically or in accordance with a user instruction; and an interactive program reproduction unit for receiving the reproduction instruction from said reproduction instruction unit and the interactive program from said storage unit so as to generate relative time information on the basis of the absolute time information obtained by said reproduction time obtaining unit and said program start time information obtained from said storage unit to thereby execute and reproduce the interactive program stored in said storage unite.

20. A receiving apparatus comprising:

an interactive program receiving unit for receiving interactive program broadcasting including an interactive program in which a time when the broadcasting is executed is indicated by a relative time from a start time of the interactive program, and including video, audio and interactive programming as a part of the broadcasting, and a TDT having an absolute time of the interactive program;

a start time receiving unit for receiving start time information corresponding to the start time of the interactive program;

a broadcast time obtaining unit for obtaining absolute time information corresponding to the absolute time when the broadcasting is performed, and for managing the absolute time information; and a relative time generation unit for generating relative time information corresponding to a relative time from starting of the interactive program on the basis of the start time information of the interactive program received by said start time receiving unit and the absolute time information obtained by said broadcast time obtaining unit.

21. A recording apparatus for recording the interactive program received by the receiving apparatus of claim 20, said recording apparatus comprising:

a recording program information creation unit for creating a SIT as program information for recording of the interactive program;

a time information management unit for recording, from the absolute time information obtained by said broadcast time obtaining unit, the relative time information in a descriptor of the SIT; and a storage unit for storing the interactive program in a recording area on a recording medium, and for storing the relative time information obtained from the descriptor of the SIT in another area on the recording medium or in a recording device.

22. The recording apparatus of claim 21, wherein said time information management unit records the absolute time information in a another descriptor of the SIT.

23. A reproduction apparatus for reproducing the interactive program recorded in the recording apparatus of claim 21 or 22, said reproduction apparatus comprising:

a reproduction time obtaining unit for receiving the relative time information stored in said storage unit, and for reproducing a flow of time at a recording time;

a reproduction instruction unit for detecting when the interactive program is recorded in said storage unit, and for issuing a reproduction instruction automatically or in accordance with a user instruction; and an interactive program reproduction unit for receiving the reproduction instruction from said reproduction instruction unit and the interactive program from said storage unit so as to execute and reproduce the interactive program stored in said storage unit on the basis of the relative time information obtained by said reproduction time obtaining unit.

24. A receiving apparatus comprising:

an interactive program receiving unit for receiving interactive program broadcasting including an interactive program in which a time when the broadcasting is executed is indicated by a relative time from a start time of the interactive program, and including video, audio and interactive programming as a part of the broadcasting;

a start time receiving unit for receiving start time information corresponding to the start time of the interactive program;

a broadcast time obtaining unit for obtaining absolute time information corresponding to an absolute time of the interactive program when the broadcasting is performed, and for managing the absolute time information; and a relative time generation unit for generating relative time information corresponding to a relative time from starting of the interactive program on the basis of the start time information of the interactive program obtained by said start time receiving unit and the absolute time information obtained by said broadcast time obtaining unit.

25. A recording apparatus for recording the interactive program received by the receiving apparatus of claim 24, said recording apparatus comprising:
a recording program information creation unit for creating program information for recording of the interactive program;
a time information management unit for recording, from the absolute time information obtained by said broadcasting time obtaining unit, the relative time information; and
a storage unit for storing the interactive program in a recording area on a recording medium, and for storing the relative time information in another area on the recording medium or in a recording device.

26. A reproduction apparatus for reproducing the interactive program recorded in the recording apparatus of claim 25, said reproduction apparatus comprising:
a reproduction time obtaining unit for receiving the relative time information stored in said storage unit, and for reproducing a flow of time at a recording time;
a reproduction instruction unit for detecting when the interactive program is recorded in said storage unit, and for issuing a reproduction instruction automatically or in accordance with a user instruction; and
an interactive program reproduction unit for receiving the reproduction instruction from said reproduction instruction unit and the interactive program from said storage unit so as to execute and reproduce the interactive program stored in said storage unit on the basis of the relative time information obtained by said reproduction time obtaining unit.

27. The recording apparatus of any one of claims 6, 10, 16, 18, 21, and 25, further comprising:
recording medium running state change detection means for detecting a change in a running state of the recording medium of said storage unit; and
running state information updating means for updating running state change information which reflects the change in the running state of the recording medium when said recording medium running state change detection means detects the change in the running state of the recording medium.

28. The recording apparatus of claim 27, wherein the running state information updating means writes the running state change information in the SIT.

29. The recording apparatus of claim 27, wherein said running state information updating means updates the running state change information in program units.

30. The recording apparatus of claim 27, wherein said running state information updating means updates the running state change information in recording apparatus units.

31. A system comprising:
a receiving apparatus for receiving an interactive program; and
a recording apparatus for recording the interactive program received by said receiving apparatus, wherein:
said receiving apparatus comprises
an interactive program receiving unit for receiving interactive program broadcasting which includes the interactive program, a TDT having an absolute time of the interactive program when the broadcasting is executed, at least one of video and audio, and interactive programming, which are each indicated as a part of the broadcasting, and
a broadcast time obtaining unit for obtaining absolute time information corresponding to the absolute time when the broadcasting is performed, and for managing the absolute time information; and
said recording apparatus comprises
a recording program information creation unit for creating a SIT as program information for recording of the interactive program,
a time information management unit for recording, from the TDT, the absolute time information obtained by said broadcast time obtaining unit in either a first descriptor or a second descriptor of the SIT,
a storage unit for storing the interactive program received by said interactive program receiving unit in a recording area on a recording medium, and for storing the absolute time information obtained from the first descriptor or the second descriptor in another area on the recording medium or in a recording device,
recording medium running state change detection means for detecting a change in a running state of the recording medium of said storage unit, and
running state information updating means for updating running state change information which reflects the change in the running state of the recording medium when said recording medium running state change detection means detects the change in the running state of the recording medium.

32. The system of claim 31, wherein said running state information updating means writes the running state change information in the SIT.

33. The recording apparatus of claim 31, wherein said running state information updating means updates the running state change information in program units.

34. The recording apparatus of claim 31, wherein said running state information updating means updates the running state change information in recording apparatus units.

35. A system comprising:
a receiving apparatus for receiving an interactive program; and
a recording apparatus for recording the interactive program received by said receiving apparatus, wherein:
said recording apparatus comprises
an interactive program receiving unit for receiving interactive program broadcasting which includes the interactive program, an absolute time of the interactive program when the broadcasting is executed, at least one of video and audio, and interactive programming, which are indicated as a part of the broadcasting, and
a broadcast time obtaining unit for obtaining absolute time information corresponding to the absolute time when the broadcasting is performed; and
said recording apparatus comprises
a recording program information creation unit for creating program information for recording of the interactive program,
a time information management unit for performing management when the absolute time information obtained by said broadcast time obtaining unit is recorded on a recording medium,
a storage unit for storing the interactive program received by said interactive program receiving unit in a recording area on the recording medium, and for storing the absolute time information in another area on the recording medium or in said recording apparatus, recording medium running state change detection means for detecting a change in a running state of the recording medium of said storage unit, and running state information updating means for updating running state change information which reflects the change in the running state of the recording medium when said recording medium running state change detection means detects the change in the running state of the recording medium.

36. The recording apparatus of claim 35, wherein said running state information updating means writes the running state change information in the SIT.

37. The recording apparatus of claim 35, wherein said running state information updating means updates the running state change information in program units.

38. The recording apparatus of claim 35, wherein said running state information updating means updates the running state change information in recording apparatus units.

* * * * *